US011361508B2

(12) United States Patent
Cheng et al.

(10) Patent No.: US 11,361,508 B2
(45) Date of Patent: Jun. 14, 2022

(54) OBJECT SCANNING USING PLANAR SEGMENTATION

(71) Applicant: QUALCOMM Incorporated, San Diego, CA (US)

(72) Inventors: Ke-Li Cheng, San Diego, CA (US); Kuang-Man Huang, Zhubei (TW); Michel Adib Sarkis, San Diego, CA (US); Gerhard Reitmayr, Del Mar, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/998,975

(22) Filed: Aug. 20, 2020

(65) Prior Publication Data

US 2022/0058871 A1    Feb. 24, 2022

(51) Int. Cl.
*G06T 17/20*    (2006.01)
*G06T 19/00*    (2011.01)
*G06T 7/12*    (2017.01)

(52) U.S. Cl.
CPC .............. *G06T 17/205* (2013.01); *G06T 7/12* (2017.01); *G06T 19/006* (2013.01); *G06T 2210/56* (2013.01)

(58) Field of Classification Search
None
See application file for complete search history.

(56) References Cited

U.S. PATENT DOCUMENTS

| 8,928,654 | B2 * | 1/2015 | Givon | H04N 13/111 345/419 |
|---|---|---|---|---|
| 2006/0034545 | A1 * | 2/2006 | Mattes | G06T 7/246 382/294 |
| 2014/0177915 | A1 * | 6/2014 | Fan | G06T 7/174 382/103 |
| 2015/0269733 | A1 * | 9/2015 | Kosaki | G06K 9/00805 382/107 |
| 2016/0055268 | A1 * | 2/2016 | Bell | G06T 19/00 703/1 |
| 2016/0196659 | A1 * | 7/2016 | Vrcelj | G06T 7/12 382/154 |
| 2018/0075593 | A1 * | 3/2018 | Wang | G06T 7/85 |

* cited by examiner

*Primary Examiner* — Robert J Craddock
(74) *Attorney, Agent, or Firm* — Polsinelli LLP

(57) ABSTRACT

Techniques are provided for generating three-dimensional models of objects from one or more images or frames. For example, at least one frame of an object in a scene can be obtained. A portion of the object is positioned on a plane in the at least one frame. The plane can be detected in the at least one frame and, based on the detected plane, the object can be segmented from the plane in the at least one frame. A three-dimensional (3D) model of the object can be generated based on segmenting the object from the plane. A refined mesh can be generated for a portion of the 3D model corresponding to the portion of the object positioned on the plane.

30 Claims, 14 Drawing Sheets

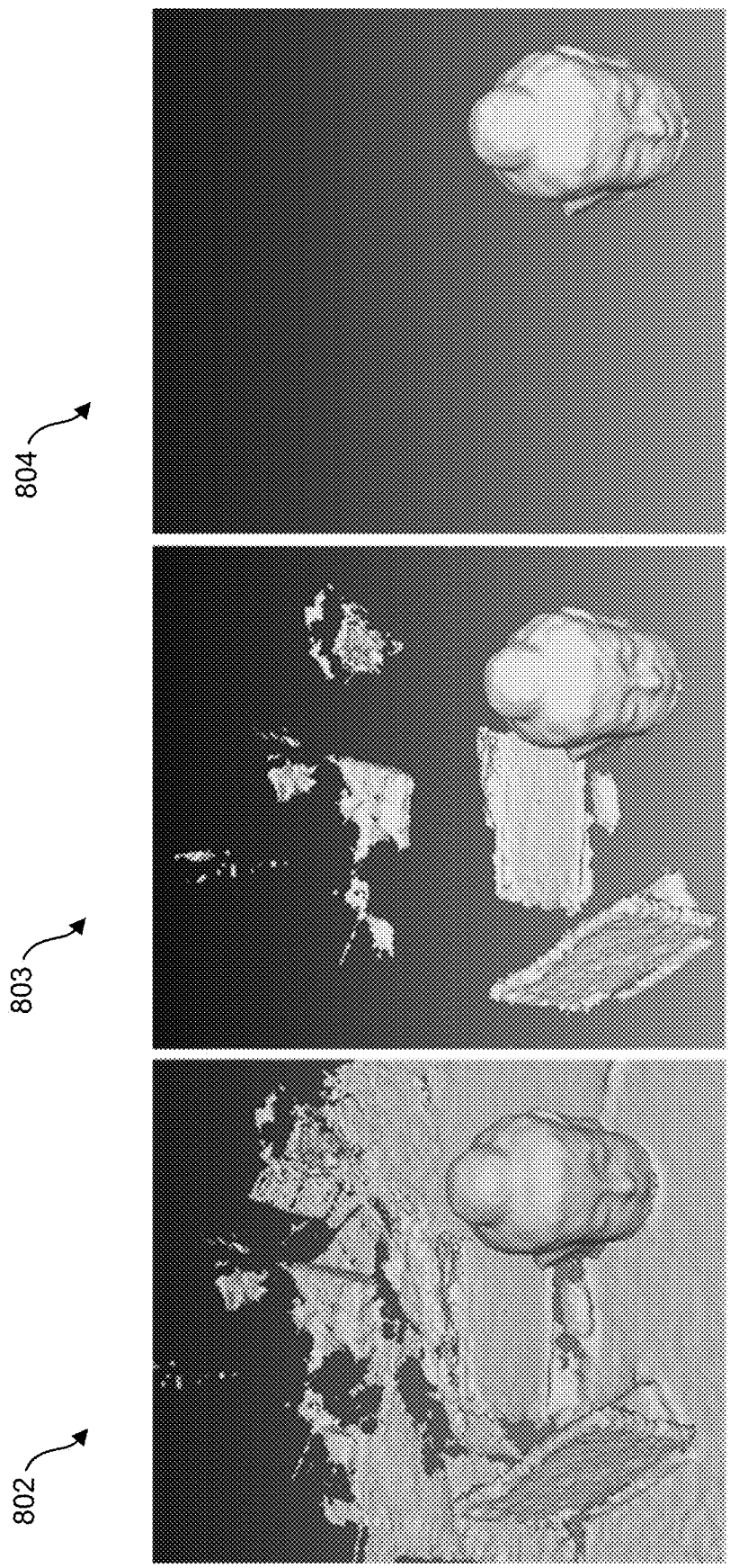

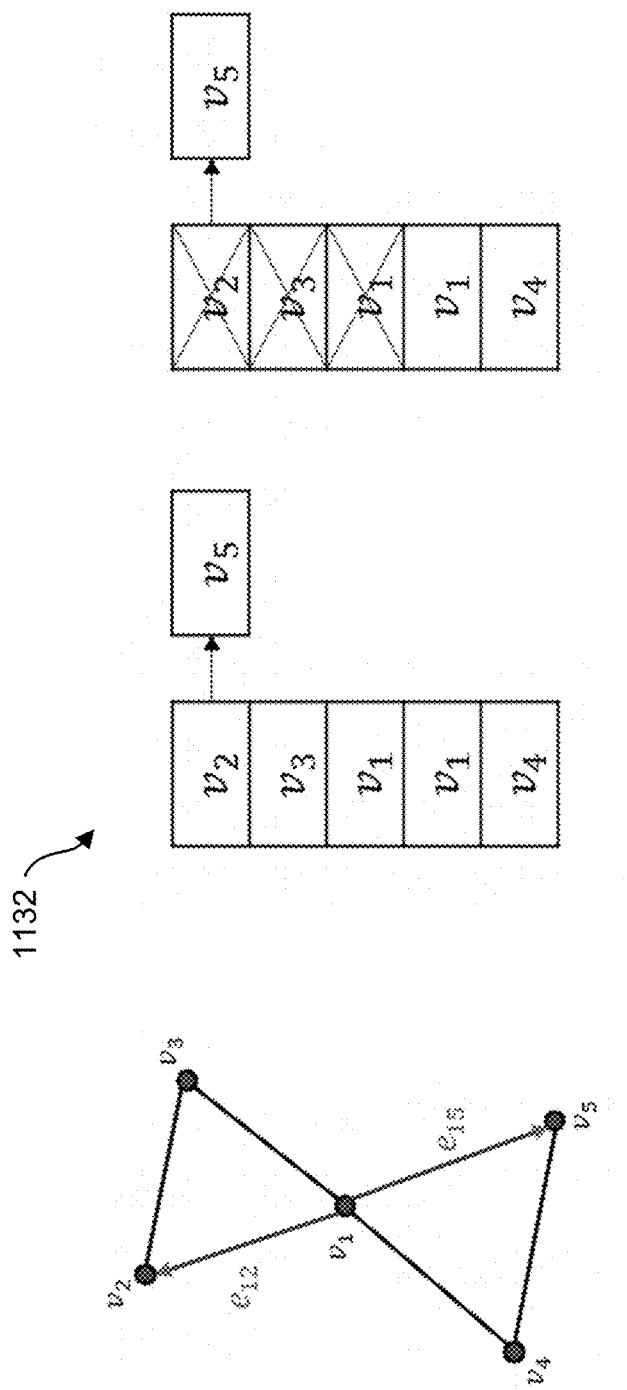

1200

OBTAIN AT LEAST ONE FRAME OF AN OBJECT IN A SCENE, WHEREIN A PORTION OF THE OBJECT IS POSITIONED ON A PLANE IN THE AT LEAST ONE FRAME
1202

↓

DETECT THE PLANE IN THE AT LEAST ONE FRAME
1204

↓

SEGMENT, BASED ON THE DETECTED PLANE, THE OBJECT FROM THE PLANE IN THE AT LEAST ONE FRAME
1206

↓

GENERATE A THREE-DIMENSIONAL (3D) MODEL OF THE OBJECT BASED ON SEGMENTING THE OBJECT FROM THE PLANE
1208

↓

GENERATE A REFINED MESH FOR A PORTION OF THE 3D MODEL OF THE OBJECT CORRESPONDING TO THE PORTION OF THE OBJECT POSITIONED ON THE PLANE
1210

FIG. 12

OBJECT SCANNING USING PLANAR SEGMENTATION

FIELD

The present disclosure generally relates to image processing, and more specifically to techniques and systems for performing object scanning using planar segmentation.

BACKGROUND

Many devices and systems allow a scene to be captured by generating frames (also referred to as images) and/or video data (including multiple frames) of the scene. For example, a camera or a computing device including a camera (e.g., a mobile device such as a mobile telephone or smartphone including one or more cameras) can capture a sequence of frames of a scene. The image and/or video data can be captured and processed by such devices and systems (e.g., mobile devices, IP cameras, etc.) and can be output for consumption (e.g., displayed on the device and/or other device). In some cases, the image and/or video data can be captured by such devices and systems and output for processing and/or consumption by other devices.

A frame or image can be processed (e.g., using object detection, recognition, segmentation, etc.) to determine any objects that are present in the frame, which can be useful for many applications. For instance, a model can be determined for representing an object in a frame, and can be used to facilitate effective operation of various systems. Examples of such applications and systems include augmented reality (AR), robotics, automotive and aviation, three-dimensional scene understanding, object grasping, object tracking, in addition to many other applications and systems.

BRIEF SUMMARY

In some examples, techniques and systems are described for processing one or more frames (or images) and performing object scanning of one or more objects in the frame(s) using planar segmentation. For instance, a frame (or a plurality of frames) can be obtained that includes an object on a planar surface. The object scanning technique using planar segmentation can be applied to the frame (or to the plurality of frames) to generate a three-dimensional model for the object on the planar surface in the frame (or plurality of frames).

According to at least one illustrative example, a method of generating one or more three-dimensional models is provided. The method includes: obtaining at least one frame of an object in a scene, wherein a portion of the object is positioned on a plane in the at least one frame; detecting the plane in the at least one frame; segmenting, based on the detected plane, the object from the plane in the at least one frame; generating a three-dimensional (3D) model of the object based on segmenting the object from the plane; and generating a refined mesh for a portion of the 3D model corresponding to the portion of the object positioned on the plane.

In another example, an apparatus for generating one or more three-dimensional models is provided that includes a memory configured to store one or more frames and one or more processors (e.g., implemented in circuitry) coupled to the memory. The one or more processors are configured to and can: obtain at least one frame of an object in a scene, wherein a portion of the object is positioned on a plane in the at least one frame; detect the plane in the at least one frame; segment, based on the detected plane, the object from the plane in the at least one frame; generate a three-dimensional (3D) model of the object based on segmenting the object from the plane; and generate a refined mesh for a portion of the 3D model corresponding to the portion of the object positioned on the plane.

In another example, a non-transitory computer-readable medium is provided that has stored thereon instructions that, when executed by one or more processors, cause the one or more processors to: obtain at least one frame of an object in a scene, wherein a portion of the object is positioned on a plane in the at least one frame; detect the plane in the at least one frame; segment, based on the detected plane, the object from the plane in the at least one frame; generate a three-dimensional (3D) model of the object based on segmenting the object from the plane; and generate a refined mesh for a portion of the 3D model corresponding to the portion of the object positioned on the plane.

In another example, an apparatus for generating one or more three-dimensional models is provided. The apparatus includes: means for obtaining at least one frame of an object in a scene, wherein a portion of the object is positioned on a plane in the at least one frame; means for detecting the plane in the at least one frame; means for segmenting, based on the detected plane, the object from the plane in the at least one frame; means for generating a three-dimensional (3D) model of the object based on segmenting the object from the plane; and means for generating a refined mesh for a portion of the 3D model corresponding to the portion of the object positioned on the plane.

In some aspects, the at least one frame includes depth information corresponding to depths of pixels of the at least one frame within the scene.

In some aspects, the at least one frame includes a first frame. In such aspects, the method, apparatuses, and computer-readable medium described above further comprise: obtaining a second frame of the object in the scene, wherein the portion of the object is positioned on the plane in the second frame; tracking the plane from the first frame to the second frame; segmenting, based on tracking the plane, the object from the plane in the second frame; and generating the 3D model of the object based on segmenting the object from the plane in the first frame and the second frame.

In some aspects, tracking the plane from the first frame to the second frame includes tracking a pose of the plane, and wherein the object is segmented from the plane based on the tracked pose of the plane in the second frame.

In some aspects, the method, apparatuses, and computer-readable medium described above further comprise: determining a number of pixels of the object segmented from the second frame; determining the number of pixels is within a threshold number of pixels of the object segmented from the first frame; and based on the number of pixels being within the threshold number of pixels of the object segmented from the first frame, determining segmentation of the object from the plane in the second frame is successful.

In some aspects, the at least one frame includes a first frame. In such aspects, the method, apparatuses, and computer-readable medium described above further comprise: obtaining a second frame of the object in the scene, wherein the portion of the object is positioned on the plane in the second frame; determining a number of frames the plane has been tracked; and determining whether to perform plane detection or object tracking on the second frame based on the number of frames the plane has been tracked.

In some aspects, the method, apparatuses, and computer-readable medium described above further comprise: detecting the plane based on plane detection in the second frame based on a determination that the number of frames the plane has been tracked meets a tracking threshold.

In some aspects, the method, apparatuses, and computer-readable medium described above further comprise: tracking the plane based on object tracking from the first frame to the second frame based on a determination that the number of frames the plane has been tracked is less than a tracking threshold.

In some aspects, the at least one frame includes a first frame. In such aspects, the method, apparatuses, and computer-readable medium described above further comprise: obtaining a second frame of the object in the scene, wherein the portion of the object is positioned on the plane in the second frame; determining a number of plane segmentation failures for the object, a plane segmentation failure occurring when the object is not segmented from the plane in a frame; and detecting the plane in the second frame based on a determination that the number of plane segmentation failures for the object meets a failure threshold.

In some aspects, generating the refined mesh for the portion of the 3D model of the object includes: generating an initial mesh for the portion of the 3D model of the object; determining a boundary set including edges of the initial mesh that belong to a single triangle of the initial mesh; and generating the refined mesh for the portion of the 3D model of the object using the boundary set.

In some aspects, generating the 3D model of the object includes: obtaining a first frame of the object in the scene; segmenting the object from the plane in the first frame; generating a first 3D mesh of points associated with the object in the first frame; obtaining a second frame of the object in the scene; segmenting the object from the plane in the second frame; generating a second 3D mesh of points associated with the object in the first frame; and combining the first 3D mesh of points and the second 3D mesh of points.

In some aspects, the apparatus comprises a camera (e.g., an IP camera), a mobile device (e.g., a mobile telephone or so-called "smartphone," or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more frames or images. In some aspects, the apparatus further includes a display for displaying one or more frames or images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 8A is an illustration of a depth map image, in accordance with some examples;

FIG. 8B is an illustration of an image including a segmentation result obtained using plane information, in accordance with some examples;

FIG. 8C is an illustration of an image including a segmentation result obtained using target object location information, in accordance with some examples;

FIG. 11A, FIG. 11B, and FIG. 11C are diagrams illustrating example operations of a boundary remeshing process, in accordance with some examples;

FIG. 12 is a flow diagram illustrating an example process for generating one or more 3D models, in accordance with some examples.

DETAILED DESCRIPTION

Figure 1B:
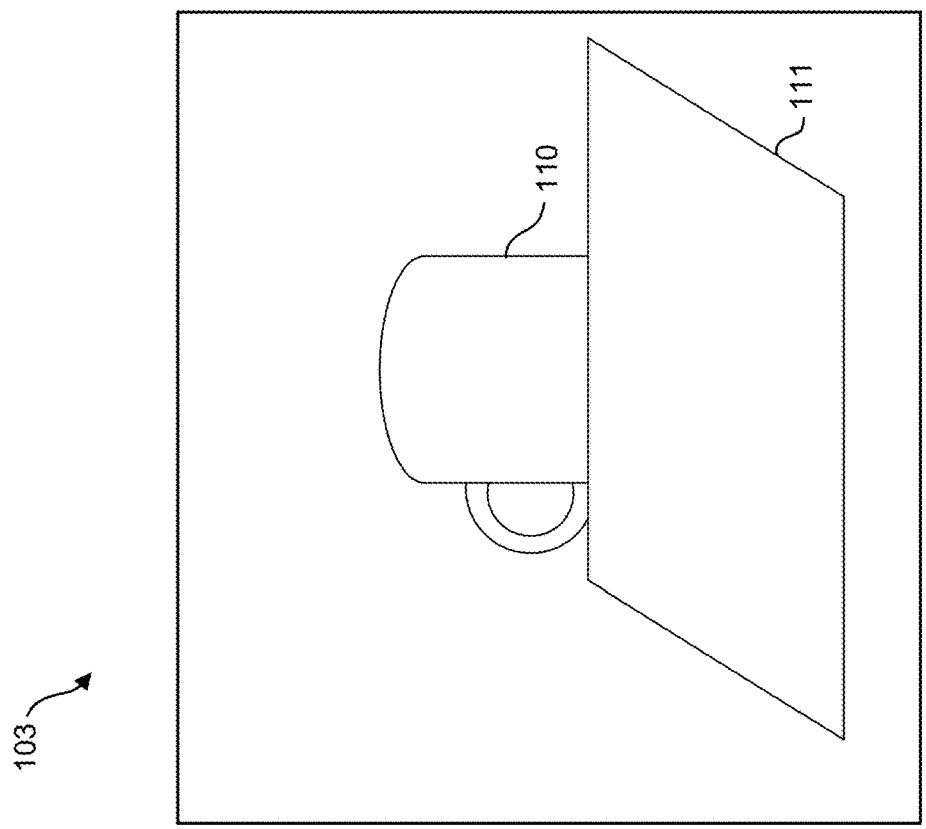
FIG. 1A, FIG. 1B, and FIG. 1C are conceptual diagrams illustrating examples of three-dimensional (3D) scanning results of an object from two different views, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The generation of three-dimensional (3D) models for physical objects can be useful for many systems and applications, such as extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view frames or images that include an integration of artificial or virtual graphics with the user's natural surroundings. As used herein, the terms "frame" and "image" are used interchangeably. For example, a frame or an image can be captured by a camera of a device, and can include pixel data defining objects, background, and/or other information in a scene captured by the image. AR applications allow frames to be processed to add virtual objects to the frames and to align or register the virtual objects to the frames in multiple dimensions. For instance, a real-world object that exists in reality can be represented using a model that resembles or is an exact match of the real-world object. In one example, a model of a virtual airplane representing a real airplane sitting or moving on a runway may be presented in the view of an AR device (e.g., mobile device, AR glasses, AR head-mounted display (HMD), or other device) while the user continues to view his or her natural surroundings in the AR environment. The viewer may be able to manipulate the model while viewing the real-world scene. In another example, an actual object sitting or moving on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

3D object scanning applications are available to allow users to build high quality 3D models with short processing times. A 3D model can include a 3D mesh of points with varying depths. Various devices are able to perform 3D object scanning functions. By incorporating new types of sensors with cutting edge tracking algorithms, device manufacturers (e.g., original equipment manufacturers or OEMs) are able to provide consumer-level devices (e.g., mobile phones such as smartphones, XR devices such as AR glasses and VR HMDs, among other devices) with 3D object scanning capabilities. By providing consumer-level devices with 3D object scanning functionality, many more users of varying skills are able to generate novel content for the virtual world.

To perform 3D object scanning for a target object, a device can capture a sequence of frames (e.g., a series of frames or a video) of the target object from different views (e.g., from different positions and angles). A 3D model (also referred to as a 3D reconstruction) can then be generated for the target object using the sequence of frames. A target object can be placed or can be moving on a support plane including a planar surface, which can lead to issues when performing 3D scanning and generating a 3D model for the object. For example, it can be difficult or impossible to scan the object without including the support plane. Further, a frame cannot be captured through the planar surface to provide a frame with a view from the bottom of the object (referred to as a bottom-to-top view). Because the support plane is included in the sequence of frames and because the portion of the object resting on the plane is occluded by the plane (in which case a frame cannot be captured through the plane), when the plane is removed during reconstruction, the 3D model will not be complete at the portion of the object resting on or near the plane (e.g., the bottom of the object). In such cases, a 3D model of the object generated using the sequence of frames will be incomplete and/or include a hollow artifact when that portion of the 3D model is displayed.

Figure 1A:
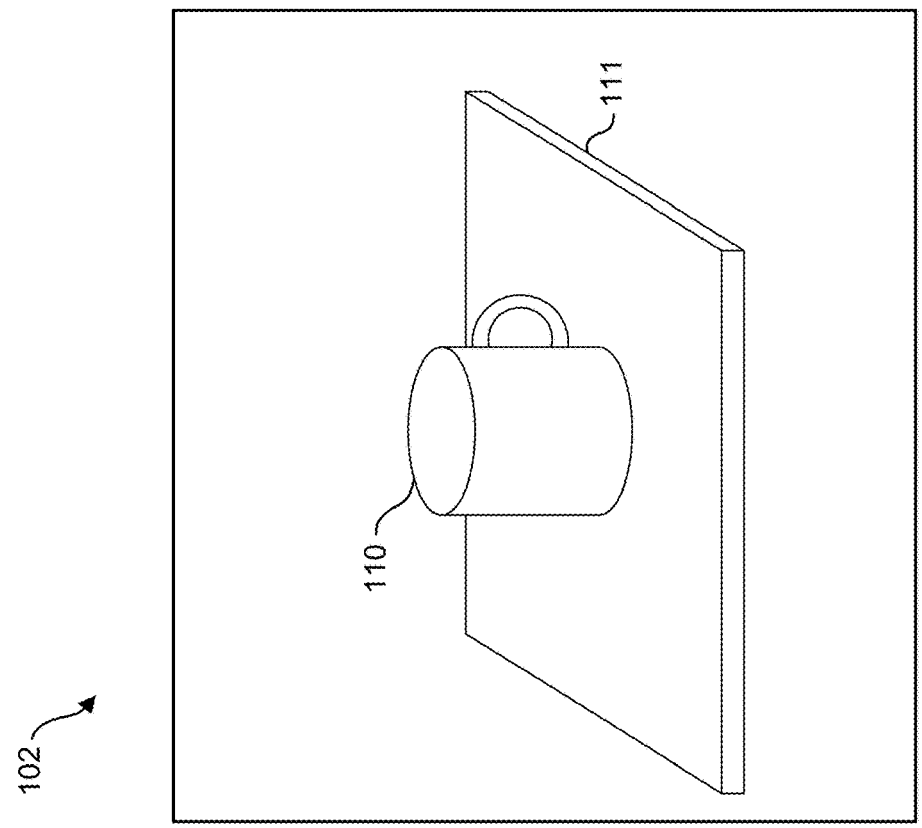
Figure 1C:
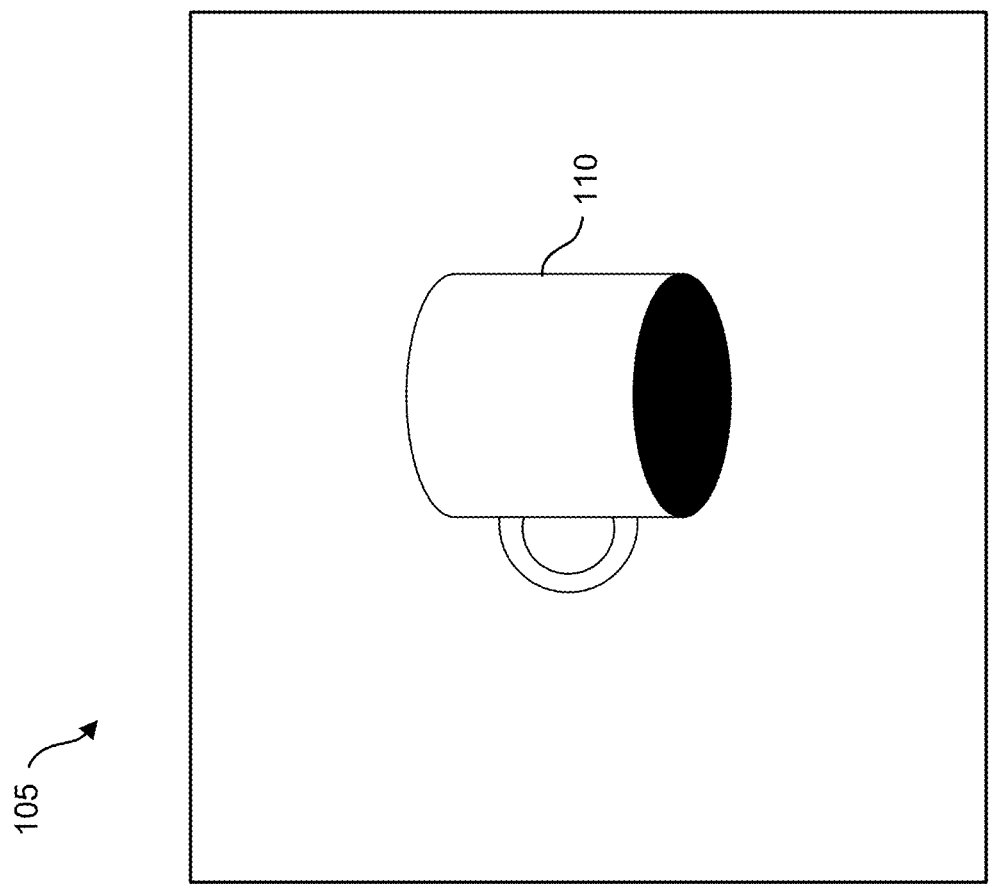

FIG. 1A and FIG. 1B are conceptual diagrams illustrating examples of 3D scanning results of an object 110 from two different views. FIG. 1A illustrates a 3D model 102 (resulting from 3D reconstruction) with a view from the top of the object (referred to as a top-to-bottom view). FIG. 1B illustrates a 3D model 103 (resulting from 3D reconstruction) from a bottom-to-top view. It can be seen from FIG. 1B that the support plane 111 upon which the object is supported can lead to a poor quality 3D model that may not be suitable for a particular application (e.g., for display using an AR or VR application or other XR application). The support plane 111 occludes the bottom of the object 110. FIG. 1C illustrates the reconstructed object 110 with a hollow bottom, due to the occluding support plane 111 shown in FIG. 1A and FIG. 1B.

Systems, apparatuses, processes (also referred to as methods), and computer-readable media (collectively referred to as "systems and techniques") are described herein for solving the above-described problems by removing the plane from the 3D model and patching the hollow portion of the object resting on the planar surface. Two high level processes that can be performed include tracking-based object segmentation and mesh completion processing. The object segmentation can include an integration of a plane detection feature into a tracking system, which can allow reconstruction of an object without the plane and with a closed portion where the object is resting on the plane (without the hollow artifact). For instance, the systems and techniques can detect the plane in each frame of a sequence of frames, and can perform object segmentation while tracking the object in the sequence of frames. The object segmentation can be performed to segment out the target object in each frame of the sequence of frames. Information associated with the portion of the object resting on the plane (the portion that is occluded by the planar surface) can be obtained and used to generate a mesh for the bottom of the 3D model of the object. The portion of the object resting on the plane will be referred to herein as the "bottom" portion of the object. However, one of ordinary skill will appreciate that the portion of the object resting on the plane can include any portion of an object.

In some implementations, the object segmentation can be performed "online" (or in "real-time" or near real-time), meaning the object segmentation can be performed as the frames are received and processed to generate the 3D model based on processing the frames. In some examples, the bottom mesh generation can be performed as a post-processing process after the 3D model has been generated. In some implementations, both the object segmentation and the bottom mesh generation can be performed online as the frames are received and processed to generate the 3D model with the bottom mesh completed.

Figure 2B:
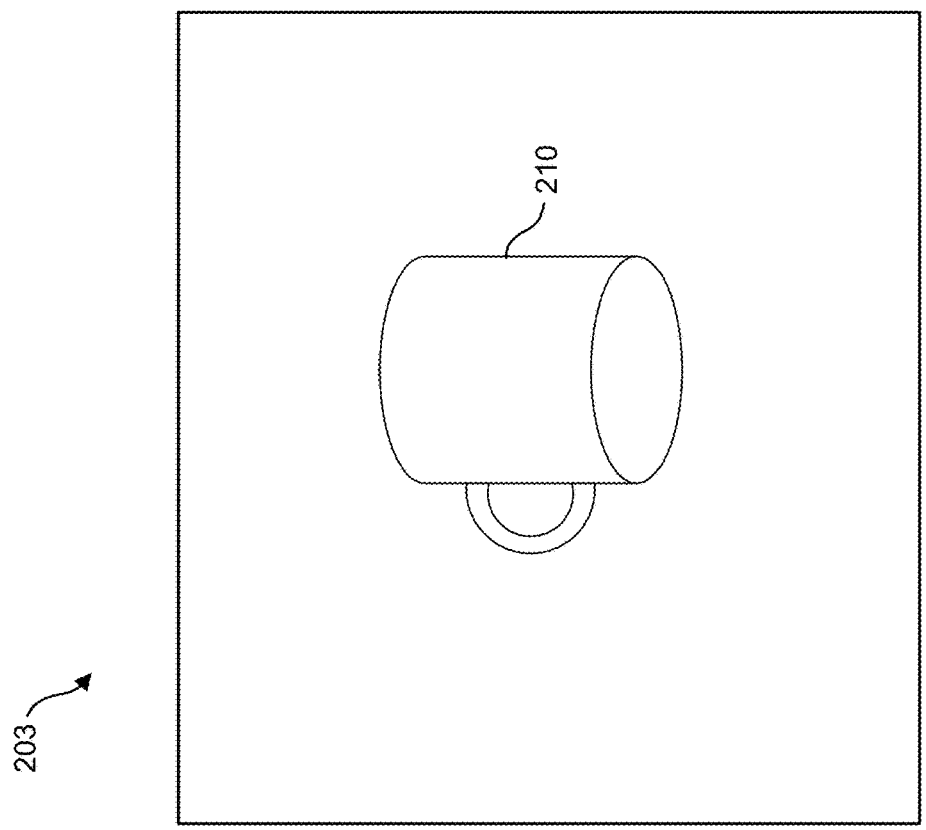
FIG. 2A and FIG. 2B are conceptual diagrams illustrating examples of reconstruction results (shown as 3D models) from two different views, in accordance with some examples.
Figure 2A:
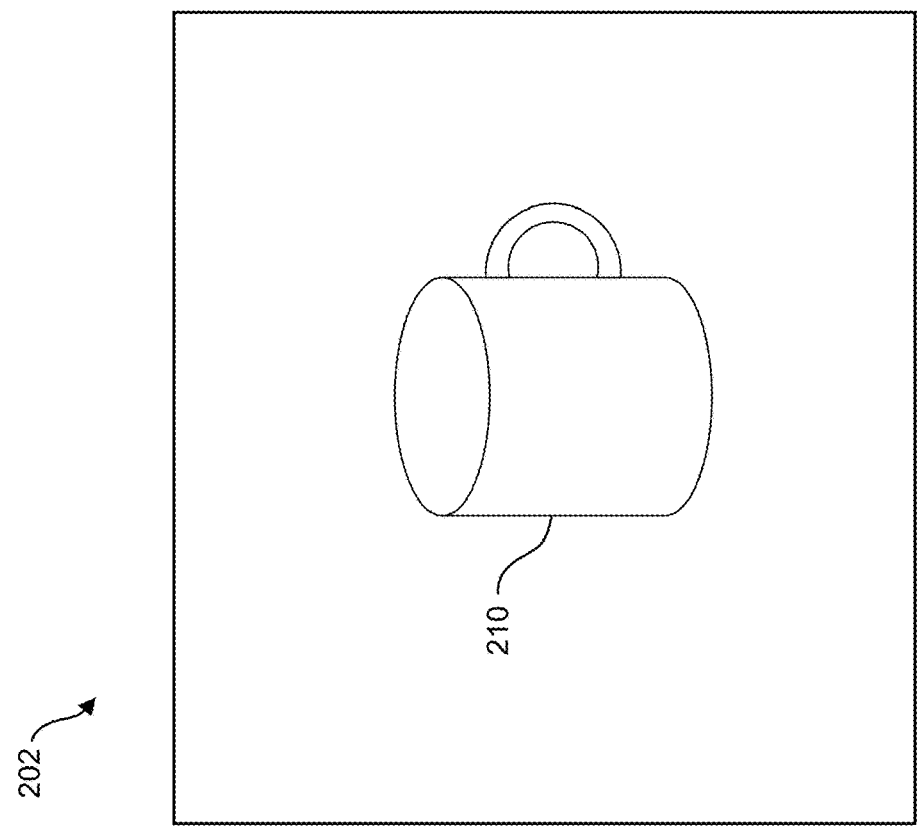

FIG. 2A and FIG. 2B are conceptual diagrams illustrating examples of reconstruction results (shown as 3D models) from two different views. For example, FIG. 2A illustrates a 3D model 202 (resulting from reconstruction) from a perspective view, and FIG. 2B illustrates a 3D model 203 (resulting from reconstruction) from a bottom-to-top view. As illustrated in FIG. 2B, the systems and techniques described herein allow a 3D model of the object 210 to be generated with the surface plane removed and with a fully completed bottom (based on generation of a mesh for the hollow bottom).

Figure 3:
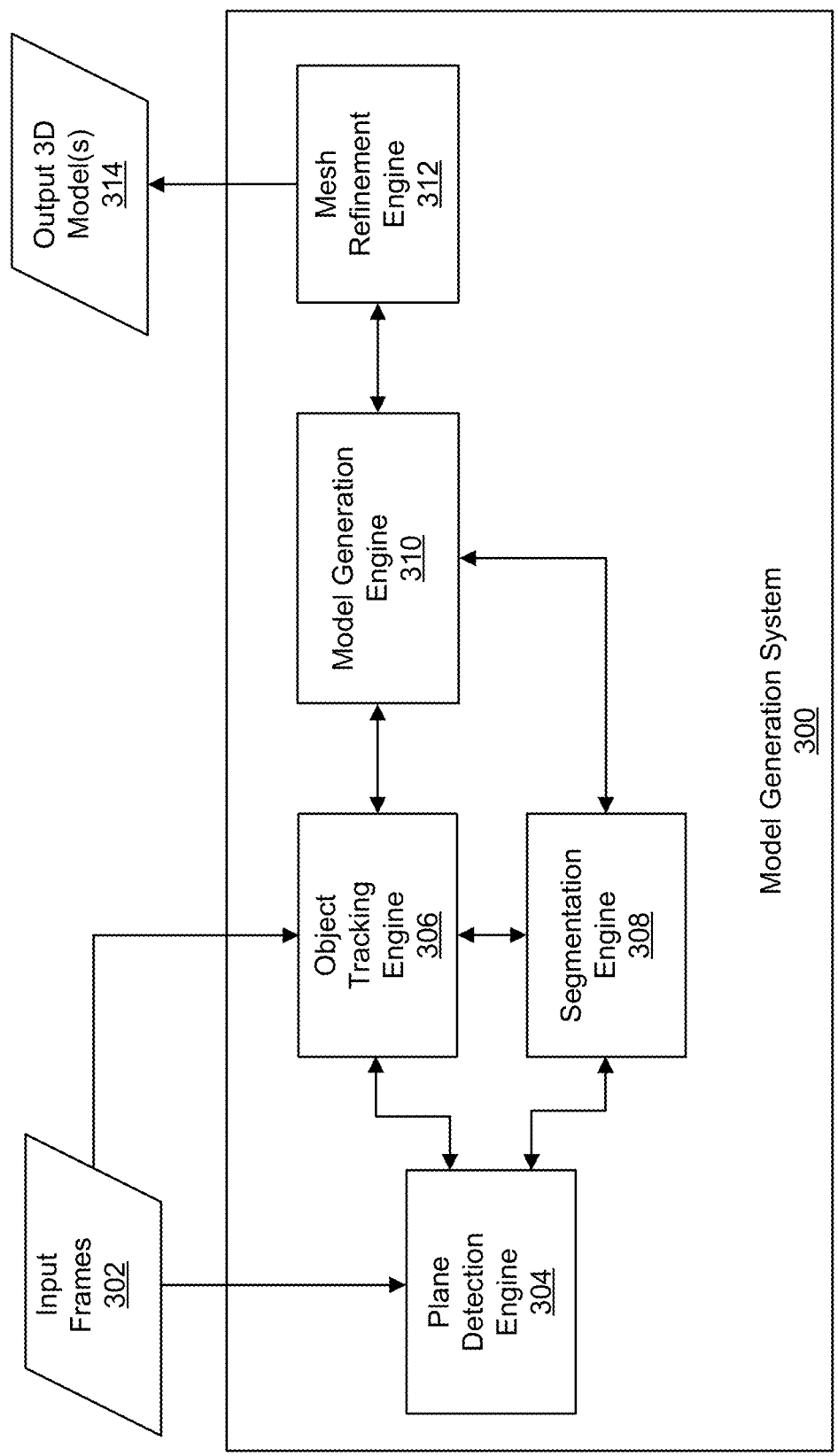
FIG. 3 is a block diagram illustrating an example of a model generation system, in accordance with some examples.

FIG. 3 is a block diagram illustrating an example model generation system 300. The model generation system 300 provides a pipeline for closed object scanning. The model generation system 300 can be used as a stand-alone solution or can be integrated into existing 3D scanning solutions. As shown in FIG. 3, the model generation system 300 includes a plane detection engine 304, an object tracking engine 306, a segmentation engine 308, a model generation engine 310, and a mesh refinement engine 312. As described in more detail below, the various components of the model generation system 300 can be used to perform object scanning by processing frames (e.g., input frames 302) of an object positioned on a planar surface, and generating one or more 3D models of the object with a closed bottom.

For example, the plane detection engine 304, the object tracking engine 306, and the segmentation engine 308 can perform a tracking-based object segmentation process. The segmentation engine 308 segments the object from the plane, allowing the model generation engine 310 to generate a 3D model of the object without the plane associated with the planar surface. Using techniques described below, the model generation system 300 can detect irregular segmentation results, is robust against drifting that can occur during tracking, and can recover from segmentation failures.

The 3D model generated by the model generation engine 310 may have a hollow bottom for a portion of the object that was occluded by the planar surface (corresponding to the portion of the object positioned on or near the planar surface). The mesh refinement engine 312 can perform a boundary remeshing process to generate a refined mesh for the bottom portion of the 3D model so that the 3D model that will be output (e.g., a 3D model 314) has a closed bottom. The boundary remeshing process works robustly on different complex bottom geometries. Using the boundary remeshing process, multiple closed boundaries (e.g., a closed loop including a continuous edge) can be detected and processed under ambiguous geometric conditions (e.g., one vertex shared by n (n>2) edges on a boundary, as described in more detail below). Further details regarding operation of the various components of the model generation system 300 are described below.

The model generation system 300 can be part of, or implemented by, a single computing device or multiple computing devices. In some examples, the model generation system 300 can include or be part of a single electronic device, such as a mobile or telephone handset (e.g., smartphone, cellular telephone, or the like), an XR device such as an HMD or AR glasses, a camera system (e.g., a digital camera, an IP camera, a video camera, a security camera, etc.), a desktop computer, a laptop or notebook computer, a tablet computer, an Internet-of-Things (IoT) device, a set-top box, a television (e.g., a network or Internet-connected television) or other display device, a digital media player, a gaming console, a video streaming device, a drone or unmanned aerial vehicle, or any other suitable electronic device. In some examples, the model generation system 300 can include one or more wireless transceivers for wireless communications, such as cellular network communications, 802.11 wi-fi communications, wireless local area network (WLAN) communications, or some combination thereof. In some implementations, the model generation system 300 can be implemented as part of the computing system 1300 shown in FIG. 13.

While the model generation system 300 is shown to include certain components, one of ordinary skill will appreciate that the model generation system 300 can include more components than those shown in FIG. 3. The components of the model generation system 300 can include software, hardware, or one or more combinations of software and hardware. For example, in some implementations, the components of the model generation system 300 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the model generation system 300.

While not shown in FIG. 3, model generation system 300 can include various compute components. The compute components can include, for example and without limitation, a central processing unit (CPU), a graphics processing unit (GPU), a digital signal processor (DSP) (such as a host processor or application processor), and/or an image signal processor (ISP). In some cases, the one or more compute components can include other electronic circuits or hardware, computer software, firmware, or any combination thereof, to perform any of the various operations described herein. The compute components can also include computing device memory, such as read only memory (ROM), random access memory (RAM), Dynamic random-access memory (DRAM), one or more cache memory devices (e.g., CPU cache or other cache components), among other memory components.

The model generation system 300 can also include one or more input/output (I/O) devices. The I/O devices can include a display screen, a keyboard, a keypad, a touchscreen, a trackpad, a touch-sensitive surface, a printer, any other output devices, any other input devices, or any combination thereof. In some examples, the I/O devices can include one or more ports, jacks, or other connectors that enable a wired connection between the model generation system 300 and one or more peripheral devices, over which the system 300 may receive data from the one or more peripheral device and/or transmit data to the one or more peripheral devices. In some examples, the I/O devices can include one or more wireless transceivers that enable a wireless connection between the model generation system 300 and one or more peripheral devices, over which the system 300 may receive data from the one or more peripheral device and/or transmit data to the one or more peripheral devices. The peripheral devices may include any of the previously-discussed types of I/O devices and may themselves be considered I/O devices once they are coupled to the ports, jacks, wireless transceivers, or other wired and/or wireless connectors.

As shown in FIG. 3, input frames 302 are input to the model generation system 300. Each frame of the input frames 302 captures an object positioned on a surface in a scene. The surface can include a planar surface in some examples. An image capture device can capture the input frames 302 from different angles during an image capture process as the image capture device is moved around the object. For instance, a user can move the image capture device around the object as the input frames 302 are captured.

Each frame includes multiple pixels, and each pixel corresponds to a set of pixel values, such as depth values, photometric values (e.g., red-green-blue (RGB) values, intensity values, chroma values, saturation values, etc.), or a combination thereof. In some examples, the input frames 302 can include depth information in addition to or as an alternative to photometric values (e.g., RGB values). For instance, the input frames 302 can include depth maps (e.g., captured by a 3D sensor such as a depth sensor or camera), red-green-blue-depth (RGB-D) frames or images, among other types of frames that include depth information. RGB-D frames allow for the recording of depth information in addition to color and/or luminance information. In one illustrative example, a depth sensor can be used to capture multiple depth maps of the object from different angles. A depth map is an image or image channel (e.g., the depth channel in an RGB-D frame) that contains information indicating the distance of the surfaces of objects in a scene from a viewpoint such as the camera.

Figure 4:
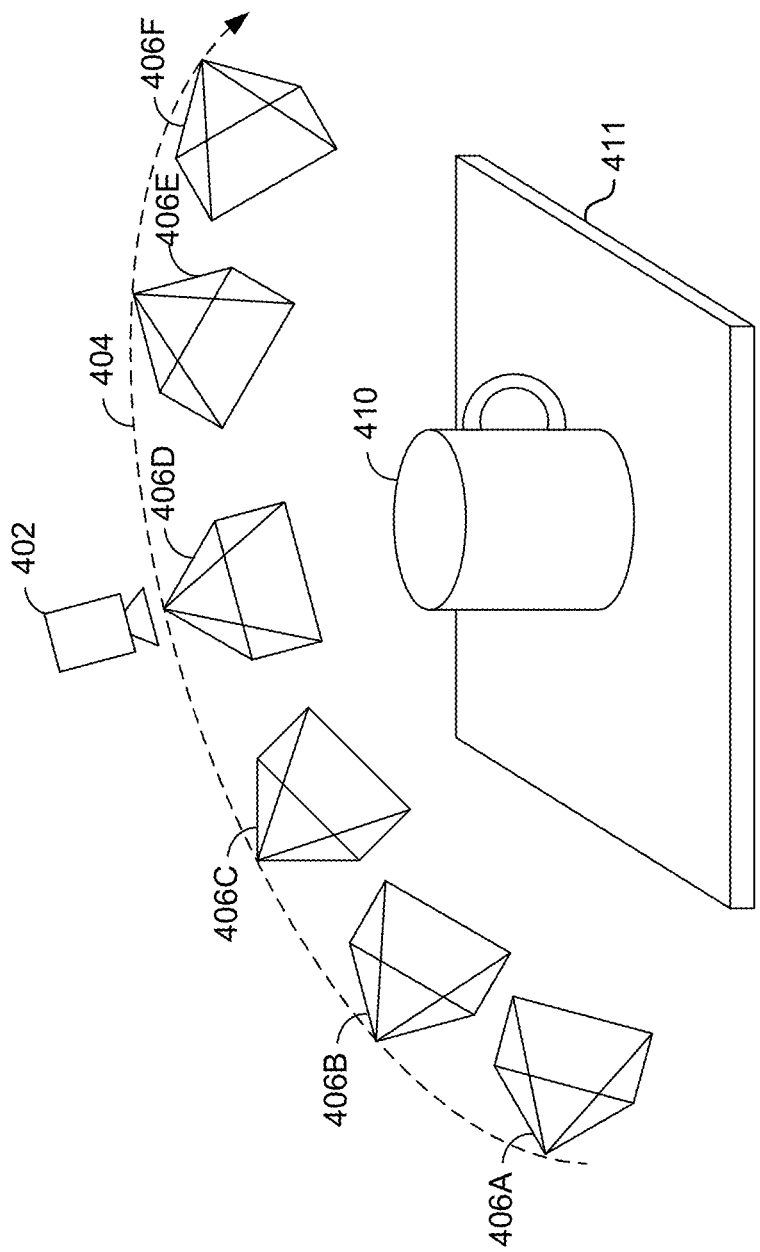
FIG. 4 is a diagram illustrating an example operation of an image capture device capturing input frames, in accordance with some examples.

FIG. 4 is a diagram illustrating an example operation of an image capture device 402 capturing input frames (e.g., the input frames 302). In some cases, the image capture device can be part of the system 300 or part of a computing device that includes the system 300. In some cases, the image capture device can be part of a separate computing device than a computing device that includes the system 300. As shown, the image capture device 402 is moved along a path 404 (e.g., shown as an arc) about or around an object 410 (a cup) on a planar surface 411. During the movement of the image capture device 402 along the path 404, the image capture device 402 is located at various positions, illustrated in FIG. 4 as camera poses 406A, 406B, 406C, 406D, 406E, and 406F. It should be noted that the number, separation, and orientation of the camera poses 406A-406F shown in FIG. 4 are shown for illustrative purposes only, and are not to be considered limiting. For example, more camera poses or fewer camera poses may be used.

The path 404 may be of any configuration, based on how the image capture device 402 is moved around the object 410. In some examples, as the image capture device 402 is moved along the path 404 from a position associated with the camera pose 406A to a position associated with the camera pose 406F, various frames of the object can be captured and used as input frames 302. For example, at the camera pose 406A, which represents an initial camera pose of the image capture device 402 at a first position along the path 404, a first frame can be captured by the image capture device 402. As the image capture device 402 continues to move along the path 404, additional frames can be captured. In some examples, frames can be continuously captured at a frame rate of the image capture device. For instance, if the frame rate of the image capture device is 30 frames per second (fps), 30 frames can be captured by the image capture device every 1 second of time. The input frames 302 can then be provided to the model generation system 300.

As noted above, the plane detection engine 304, the object tracking engine 306, and the segmentation engine 308 can perform a tracking-based object segmentation process using the input frames 302. For example, a tracking-based mechanism can track the planar surface (upon which the object is positioned) so that planar detection is performed by the plane detection engine 304 for less than all of the input frames 302. In one example, the plane detection engine 304 can perform planar detection to detect one or more planes in one or more frames at the beginning of the sequence of input frames 302 (e.g., for a first frame, an initial frame, or one of the initial frames of the input frames 302). In some cases, the plane detection engine 304 can perform planar detection again for a later frame. For instance, the plane detection engine 304 can perform planar detection again when a plane is lost by the object tracking engine 306 (e.g., when tracking of the plane is lost or fails). For other frames of the input frames 302 after a plane is detected in the one or more frames for which planar detection has been performed, the object tracking engine 306 can track the plane from frame-to-frame. In some examples, the object tracking engine 306 can track the object on the plane in addition to tracking the plane. As noted above, the image capture device can be moved around the object (which can be stationary on the planar surface or can be moving on the planar surface) as the frames 302 are being captured. The tracking performed by the object tracking engine 306 can include tracking the position of the image capture device relative to the object for each frame of the input frames 302. Based on the plane detected by the plane detection engine 304 or tracked by the object tracking engine 306, the segmentation engine 308 can segment the object from the plane in each frame, and can provide the segmentation results to the model generation engine 310.

In some examples, object tracking is performed using all of the input frames 302, while only certain frames (referred to herein as keyframes) are used by the model generation engine 310 to generate the 3D model for the object in the input frames. For example, when capturing the frames of the object, the object can be scanned using an image capture device that captures frames at a frame rate of 30 frames per second (fps) or any other frame rate. Tracking of the plane (and the object on the plane in some cases) can be performed and the pose of the plane can be computed for tracking at every frame, in which case the pose is captured 30 times per second.

A keyframe can be selected or defined manually or automatically. For example, a device can capture a plurality of frames of the object. From the plurality of captured frames, one or more of the frames can be designated as keyframes. Frames of the plurality of frames other than the keyframes can be non-keyframes. In some examples, the non-keyframes can be used for tracking and/or object detection based segmentation, but not for 3D model generation. In some examples, keyframes can be automatically determined from the plurality of frames captured by the image capture device based on a difference between a current frame and one or more previous frames. In some cases, the frames can be compared on a pixel-by-pixel basis. For instance, all pixels or a subset of pixels in the current frame can be compared to all pixels or a subset of pixels in the one or more previous frames. The pixel-by-pixel comparison can include a comparison between pixel values (e.g., depth values, photometric values, or a combination thereof) of a first frame and pixel values of the second frame (which can include a keyframe or a non-keyframe).

The difference can be based on an amount of overlap between different frames, a difference in the angle of the camera relative to the object in each frame, any combination thereof, and/or other factors. In one illustrative example, an overlap threshold can be set to a certain value (e.g., a value of 50% or any other value). An overlap amount between two or more frames can be determined, which provides a numerical representation of similarity between the two or more frames of the sequence of frames. For example, the overlap amount can be determined by a number of similar pixels divided by a total number of pixels. Pixels of two or more frames may be determined to be similar when the pixels exactly match (e.g., have the same numeric value for a particular pixel value) or when the pixels substantially match (e.g., the numerical value of a first pixel is within a difference threshold of a corresponding numerical value of a second pixel).

In some cases, the amount of overlap can be based on an overlap between an object captured in different frames (e.g., based on a number of pixels of the object that exactly or substantially match between the frames). For example, if the amount of overlap between the object captured in the current frame and the object captured in a previous frame is greater than the overlap threshold (e.g., greater than 50%), the current frame is not considered a keyframe. In another example, if the amount of overlap between the object captured in the current frame and the object captured in a previous frame is less than the overlap threshold (e.g., less than 50%), the current frame may be designated as a keyframe. In some examples, the amount of overlap determined to be greater than or less than the overlap threshold can be based on the overall difference in the frames being compared (e.g., not based only on the pixels of the object).

Figure 5B:
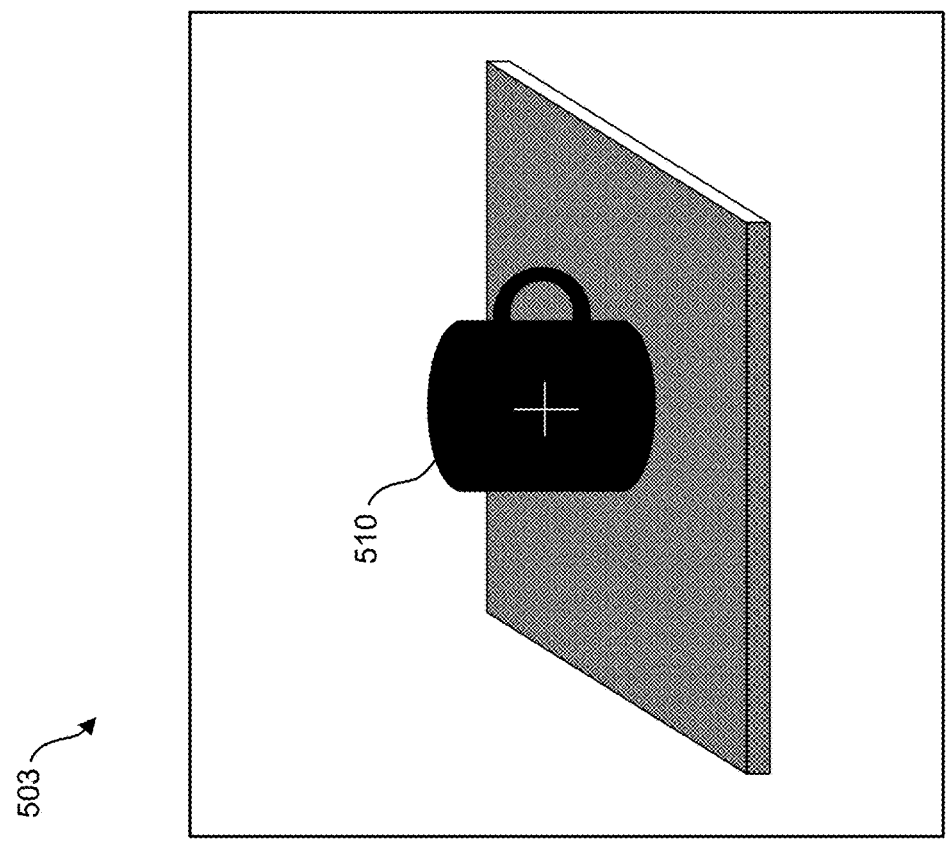
FIG. 5A and FIG. 5B are conceptual diagrams illustrating results of object segmentation using plane detection, in accordance with some examples.
Figure 5A:
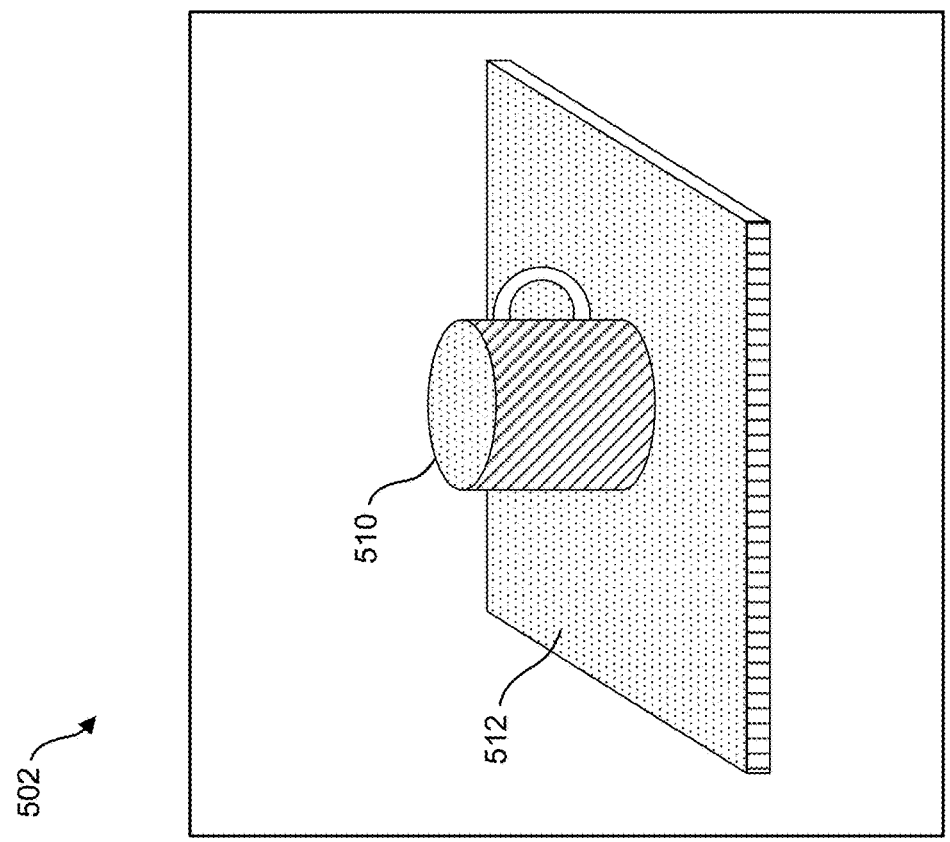

The plane detection engine 304 can use any suitable plane detection or estimation solution. In some examples, as noted above, the input frames 302 can include depth maps (also referred to as depth map images). The plane detection engine 304 can detect or identify one or more planes in the depth map images. For instance, the plane detection engine 304 can assign individual depth pixels to a particular plane hypothesis, which is an estimate of the 3D position and/or pose of the plane. The plane detection engine 304 can estimate plane parameters for one or more of the plane hypotheses. The plane parameters are variables that define one or more 3D points of a plane (e.g., parameters A, B, and C shown below with respect to Equations (1)-(3)). In some cases, as described below, a plane detection technique can be performed that grows a region of pixels labelled with a sample plane using a flood fill technique (as illustrated in FIG. 5A and FIG. 5B, discussed below). The sample plane can include an initial plane estimate (or hypothesis) for a plane in a frame. The flood fill technique can determine whether a pixel or point belongs to the plane by analyzing a neighborhood of pixels around the pixel or point (e.g., four points located on the left, right, above, and below the pixel or point).

A point P of a plane hypothesis (e.g., a point defining the plane being estimated) can be defined in three dimensions (including a horizontal or x-dimension, a vertical or y-dimension, and a depth or z-dimension) as P=(x, y, z)). A plane hypothesis can be represented as a 3D vector Π=(A, B, C), such that for a point P=(x, y, z) the following equation holds:

$$Ax+By+Cz=1 \quad \text{Equation (1)}$$

A variable z represents values measured by an image capture device (e.g., depth values captured by a depth camera). Dividing Equation (1) by z yields the following:

$$A\frac{x}{z}+B\frac{y}{z}+C+=\frac{1}{z} \quad \text{Equation (2)}$$

Equation (2) corresponds to an observation of a pixel p=(u, v) with depth z from a depth map frame, so that Equation (2) can be written as:

$$Au+Bv+C=\frac{1}{z} \quad \text{Equation (3)}$$

Equation (3) is a linear measurement function for 1/z and can be used to directly estimate the plane parameters (A, B, C) using least squares estimation.

As noted above, plane detection or estimation can be performed to estimate the plane parameters (A, B, C) of a plane for a current frame. A plane detected or estimated by the plane detection engine 304 can be used to segment the plane and/or an object sitting or moving on the plane from the current frame. In some cases, the plane detection engine 304 can perform the plane detection in a recursive manner. An input to the plane detection algorithm can include a frame with inverse depth values 1/z (e.g., as used in Equation (3)) and linear camera calibration parameters. It can be assumed that the camera does not have any non-linear distortions. For N points $$P_i = (x_i, y_i, z_i, 1) \sim \left(u_i, v_i, 1, \frac{1}{z_i}\right),$$

the following full design matrix can be generated:

$$J = \begin{pmatrix} u_1 & v_1 & 1 \\ \vdots & \vdots & \vdots \\ u_N & v_N & \ldots & 1 \end{pmatrix}$$

and a residual vector used in determining the plane parameters (A, B, C) can be determined as follows:

$$r = \begin{pmatrix} \frac{1}{z_1} \\ \vdots \\ \frac{1}{z_N} \end{pmatrix}$$

The least squares solution for the plane Π=(A, B, C) can then be given by:

$$J^T J\Pi = J^T r \quad \text{Equation (4)}$$

where T represents a transpose operation. Equation (4) can be solved using standard Cholesky decomposition. For newly measured points $P_i$ that are received, the Cholesky decomposition can be updated with a rank-1 update to obtain a plane estimate for the current frame based on the newly measured points Pt. For all points from the current frame labelled as belonging to the plane, a residual squared error can be computed as follows to determine how well the plane fits the selected points:

$$e=\|r-J\Pi\|^2=r^T r-2\Pi^T J^T r+\Pi^T J^T J\Pi \quad \text{Equation (5)}$$

The terms can again be computed recursively for new incoming measurements and are kept for the Cholesky decomposition.

In one illustrative example, to estimate a single plane in a depth map frame, the following algorithm can be applied as follows (denoted as Algorithm 1):

1. Pick a start point (or pixel) $P_1$ and two neighboring points (or pixels) $P_2$, $P_3$ (in the x and y directions) and add the points $P_2$, $P_3$ to a set of points S that are determined to belong to the plane in the depth map frame.

-continued

2. Initialize the matrices $D = J^T J$, $E = J^T r$ and $F = r^T r$.
3. Estimate the plane parameters $\Pi$ from $D\Pi = E$.
4. Choose a point $P_i$ at the boundary of S.
5. Test if the distance of $\Pi$ to $P\_i$ is below a threshold $T_1$:

$$\left| Au + Bv + C - \frac{1}{z} \right| < T_1$$

6. If yes, add the point $P_i$ to the set of points S and update D, E, F.
7. If no, go back to step 4.
8. Estimate plane parameters $\Pi$ from $D\Pi = E$.
9. Test if a root-mean square (RMS) error (RMSE) is below a threshold $T_2$:
   $RMSE = |e|/N = |F - 2\Pi^T E + \Pi^T D\Pi|/N < T_2$
10. While $RMSE < T_2$ go to step 4.

The algorithm loop can be performed for as many planes as desired in a frame. All remaining points (e.g., pixels from the depth map frame) that are not part of a plane can then be labelled as clutter (e.g., including points belonging to objects on the plane). In some cases, the algorithm can be applied until all points from the depth map frame are assigned (no points or pixels are left). Applying Algorithm 1 until all points or pixels from a frame are assigned can return a single component of points or pixels (a single connected component) that all lie in a single plane defined by a plane equation (e.g., equation (1) above). The algorithm can be applied again on a new start point or pixel that is outside of the single connected component.

In some cases, as described in more detail below, a shape proxy can be generated that represents an estimated shape of a target object (e.g., an object sitting or moving on a plane) that is to be segmented from the input frames 302 by the segmentation engine 308. The shape proxy can be used to provide an approximate location for the target object in the input frames 302. The shape proxy can be updated when a new keyframe is selected from the input frames 302. The shape proxy can then be projected to a current frame (that is currently being processed) and used to provide seed points that specify the approximate location for the target object in the current frame. In some cases, given seed points (as starting points) and the tracked planar surface for the current frame, the flood fill technique noted above can be applied by the segmentation engine 308 to segment the target object from the current frame. As described below, techniques are described herein that strengthen the robustness of the segmentation (e.g., plane segmentation and/or segmentation of a target object) against accumulated tracking error. Using such a solution, the system 300 can recover against pose drifting, and can provide very stable object segmentation throughout the sequence of input frames 302.

FIG. 5A and FIG. 5B are conceptual diagrams illustrating results of a target object 510 being segmented using plane detection results from the plane detection engine 304. For example, as described above, plane detection can categorize depth pixels in one or more depth map images to different planes detected in the frames. The image 502 in FIG. 5A illustrates an example of different pixels being categorized to different planes (with different patterns denoting different detected planes). In some examples, the plane detection engine 304 can select the largest plane having a similar normal direction with gravity as the support plane, which is plane 512 in FIG. 5. In some cases, if the plane that a target object is on is not the largest plane (in a frame) out of a plurality of frames (in the frame) having a similar normal direction with gravity as the plane, the plane detection engine 304 can select the plane on which the target object is sitting. FIG. 5B illustrates a segmentation result, where the target object 510 is segmented out from the image 503. For instance, using a shape proxy for the target object, the plane detection engine 304 can denote the location of the target object 510 as the location shown by the white cross in FIG. 5B. The complete region of the target object 510 (the black area shown in FIG. 5B) can be computed by growing the "white cross" using a four-connected neighborhood (up, down, left, and right) and stopping when the support plane is reached, as described above.

Applying plane detection for every frame lacks efficiency. For example, for an online or real-time solution that generates a 3D model (including a 3D mesh of points), performing plane detection for every frame can delay the 3D model generation process and can consume unnecessary computing resources. Some systems use object tracking to track planes across frames instead of performing plane detection. For example, based on plane detection performed on an initial frame, such systems track a planar surface and segment the object placed or moving on the planar surface. These systems do not perform plane detection, but instead track the pose of the camera in each frame to update the location and pose of the plane in each frame. In such systems, plane segmentation for a given frame is heavily reliant on the accuracy of the pose estimated for the plane in the frame. In some cases, the poses of planes determined during the plane tracking can encounter multiple problems, such as error accumulation, drifting, and can even completely lose tracking of the planar surface. For example, there are differences in poses of a plane between each consecutive frame. The pose information of a plane resulting from tracking of the plane in each frame can have some error, which can accumulate over time. Such problems can undermine the result of the object segmentation.

Instead of detecting a plane for every frame, the plane detection engine 304 can detect one or more planes (e.g., by updating one or more of the plane equations (1)-(5) above) and the segmentation engine 308 can perform segmentation based on the detected planes for certain frames. Tracking based object segmentation can be performed on frames for which plane detection is not applied. For example, plane detection may be performed when the input frames 302 are first received (e.g., for a first frame, an initial frame, or one of the initial frames of the input frames 302) and when certain metrics are observed (e.g., segmentation consistency is below a certain level, when tracking of the plane is lost or fails, etc.). Such a solution can greatly reduce the complexity of the 3D model generation process, as plane detection can be a highly time-consuming and resource-consuming process. For instance, as shown in Table 1 below, the time required for performing plane detection is far greater than the time for performing object tracking for a given frame. Further, performing plane detection when such metrics are observed can prevent the problems that arise in view of error accumulation, drifting, and loss of tracking of the planar surface.

TABLE 1

Time comparison between plane detection and tracking based object segmentation

| Plane detection based(ms) | Tracking based(ms) |
|---|---|
| 17.3 | 3.2 |

Figure 6:
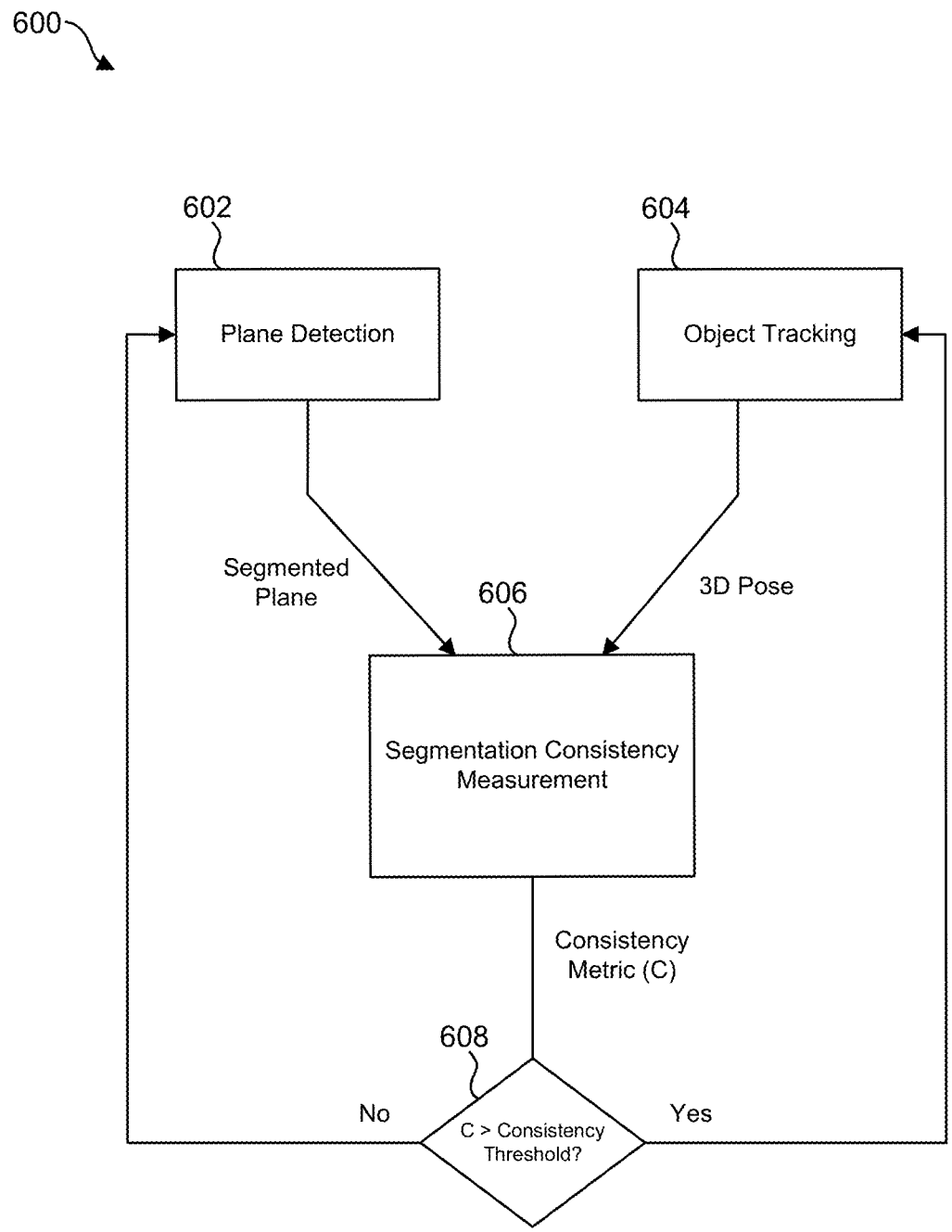
FIG. 6 is a flow diagram illustrating an example process for performing plane detection based on a segmentation consistency metric, in accordance with some examples.

FIG. 6 is a flow diagram illustrating an example of a process 600 for performing plane detection based on a segmentation consistency metric (C). At operation 602, plane detection can be performed for a first frame to generate a segmented plane (based on processing of the detected plane by the segmentation engine 308). At operation 604, for one or more subsequent frames after the first frame, object tracking can be performed to determine a 3D pose of the plane (e.g., based on a pose of the camera). The 3D pose of the plane can be used by the segmentation engine 308 to segment the plane and the object in the frame.

At operation 606, the process 600 determines a segmentation consistency measurement to determine a consistency metric (C). At operation 608, the process 600 determines whether the consistency metric (C) is greater than a consistency threshold. If C is greater than the consistency threshold (a "Yes" decision at operation 608), the process 600 performs object tracking and continues to track the plane in the frame and to use the tracking result for plane segmentation. If C is not greater than (or is less than) the consistency threshold, the process 600 performs plane detection and uses the plane detection result for plane segmentation. The consistency metric (C) allows the model generation system 300 to perform tracking-based object segmentation while being robust against pose error.

The consistency metric (C) can be based on one or more factors or metrics. In some cases, the consistency measure (C) can be based on multiple metrics, and one or more of the metrics can be associated with a particular threshold. Tracking or plane detection can be performed based on a comparison of a given metric to its corresponding a threshold. For example, a first metric (referred to as a pixel similarity metric) that can be used is based on determining whether the segmentation result is unreliable against the tracking error accumulation (where tracking error accumulation can incorrectly identify certain pixels as part of the plane). The pixel similarity metric is based on assuming that the number of segmented pixels for the tracked plane between nearby frames should not diverge by too large of a margin (e.g., is within a threshold number of pixels). The number of pixels determined for a most recent successful plane segmentation can be denoted $N_p$. The number of pixels $N_c$ of a current segmentation result (for a current frame being processed) can be considered successful if the following condition is met: $t1N_p < N_c < t2N_p$. In one illustrative example, $t1=0.7$ and $t2=1.3$, in which case $N_c$ is successful if $0.7N_p < N_c < 1.3N_p$. A successful $N_c$ can be stored as the most recent successful segmentation result $N_p$ and used as the pixel similarity metric for the consistency metric (C).

A second metric for which the consistency metric (C) can be based is referred to as a plane tracking metric T (also referred to as a tracking threshold). The plane tracking metric T is a number representing the number of frames where the plane was continuously tracked. In some cases, plane detection can be applied by the plane detection engine 304 once T reaches or exceeds a maximum number $T_{MAX}$. $T_{MAX}$ can be set to any suitable value. In one illustrative example, $T_{MAX}$ can be set to a value of 5. Using the plane tracking metric T can be useful for dealing with drifting (when tracking of the plane begins to have errors).

In some cases, the entire object can move out of scene being captured by the input frames 302, in which case object segmentation would fail no matter how well the plane is computed by the plane detection engine 304. Object segmentation may also fail if not enough pixels associated with the object are present in a given frame. To deal with such an issue, a failure metric F (also referred to as a failure threshold) is used as a parameter to count the number of continuous plane segmentation failures. Once the segmentation starts failing, the failure metric F is incremented until F reaches or exceeds a maximum failure number $F_{MAX}$. $F_{MAX}$ can be set to any suitable value. In one illustrative example, $F_{MAX}$ can be set to a value of 2. Once $F_{MAX}$ is reached, plane detection can be applied by the plane detection engine 304.

In some cases, a status vector $M=\{N_p, T, F, P\}$ can be defined to indicate the current segmentation status, such that $N_p$ is the aggregated number of pixels for a most recent successful plane segmentation, T is the number of frames for which the plane has continuously been tracked, F is the number of continuous segmentation failures, and P is the most recent detected plane equation (e.g., equation (1) above). During the tracking-based object segmentation process (prior to the boundary remeshing process), M can be updated to measure and deal with potential pose errors.

Figure 7:
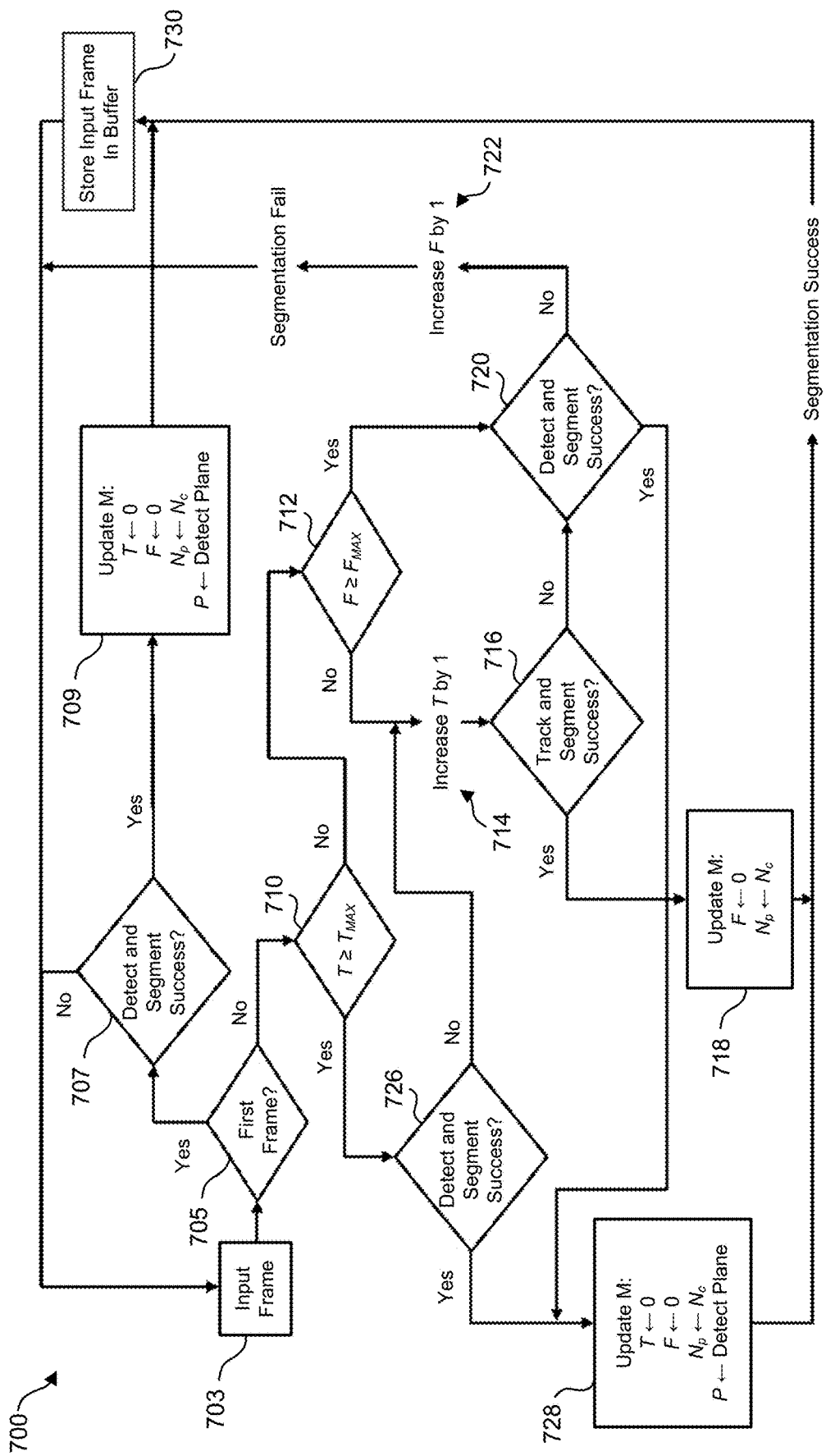
FIG. 7 is a flow diagram illustrating an example tracking-based object segmentation process, in accordance with some examples.

FIG. 7 is a flow diagram illustrating an example of a tracking-based object segmentation process 700. It can be seen from FIG. 7 that each input frame will either go through tracking, detection, or both tracking and detection according to the current status M. The status M will change dynamically in the procedure and will be reassigned when tracking or detection is successful.

An input frame is received at operation 703. When being processed by the process 700, an input frame is referred to as a current frame. At operation 705, the process 700 determines whether the current frame is the first frame (e.g., an initial or beginning frame) of a sequence of frames. If the current frame is a first frame of the sequence, the process 700 performs plane detection and object segmentation (to segment the plane and object in the frame) based on the plane detection results. At operation 707, the process 700 determines whether the plane detection based segmentation is successful. In some examples, for the decision blocks that determine whether plane detection based segmentation was successful (including operations 707, 720, and 726), the plane detection based segmentation is considered a success if the detected object size $N_c$ satisfies the following equation:

$$\begin{cases} t1N_p < N_c < t2N_p, F < F_{MAX} \\ N_c > B_{MIN}, F \geq F_{MAX} \end{cases} \qquad \text{Equation (6)}$$

where $B_{MIN}$ denotes a pre-defined minimal size assumption of the target object. $B_{MIN}$ can be set to any suitable value. In one illustrative example, $B_{MIN}$ can be set to a value of 1000. The condition F is added to the above determination, at least in part because as the number of continuous segmentation failures F becomes large, the number of pixels $N_p$ for a most recent successful plane segmentation will become less reliable as a reference. When F reaches $F_{MAX}$, it can be considered that the current frame and the frame for which $N_p$ was determined are no longer nearby frames. In this case, the metric can be relaxed and the process 700 can return a successful result once the object on the plane is segmented with a reasonable size (as defined by $B_{MIN}$).

If the process 700 determines at operation 707 that the detection based segmentation was successful (a "Yes" decision), the process 700 can update the current segmentation status M at operation 709 (including setting T=0, F=0, $N_p=N_c$ and P as the plane equation for the plane detected in the current frame before operation 707). Once the status M is updated, the current frame is stored in a buffer (or other type of storage) at operation 730. The buffer stores keyframes or frames that are used to determine keyframes. As noted above, the keyframes are used by the model generation engine 310 to generate the 3D model for the object in the input frames. It is noted that, according to the process 700, only frames that have a successful segmentation result are stored in the buffer. Frames for which it is determined that the segmentation result is a failure are not used in generating the 3D model for the object.

Returning to operation 707, if it is determined that the detection based segmentation was not successful (a "No" decision) based on conditions noted above, the process 700 obtains a next frame for processing. In some cases, the frame can be discarded (e.g., not stored for use by the model generation engine 310 in determining the 3D model) if the segmentation is determined not to be successful for that frame.

If a current frame is not a first frame (a "No" decision at operation 705), the process 700 determines at operation 710 whether the T value for the current frame (indicating the number of frames for which the plane has continuously been tracked as of the current frame) is greater than or equal to $T_{MAX}$ (shown as $T \geq T_{MAX}$). If it is determined at operation 710 that T is less than $T_{MAX}$ (or is not greater than or equal to $T_{MAX}$), the process 700 determines at operation 712 whether the F value for the current frame (indicating the number of continuous segmentation failures as of the current frame) is greater than or equal to $F_{MAX}$ (shown as $F \geq F_{MAX}$). If it is determined that F is less than $F_{MAX}$ (or is not greater than or equal to $F_{MAX}$), the process 700 increases the value of T by 1 at operation 714. The process 700 can then perform object tracking to track the plane from the previous frame to the current frame (using the object tracking engine 306) and can perform object segmentation to segment the plane and the object from the current frame (using the segmentation engine 308). The model generation engine 310 can obtain the segmented object information and can generate a 3D point cloud (e.g., a partial 3D point cloud of the object) that can be used to generate a 3D model for the object.

The process 700 can then proceed to operation 716 to determine whether the tracking based segmentation is successful. For the operation 716, a successful segmentation result is returned (a "Yes" decision) if the $t1N_p < N_c < t2N_p$ condition is met. In one illustrative example, t1=0.7 and t2=1.3, in which case a successful tracking based segmentation result is determined at operation 716 if $0.7N_p < N_c < 1.3N_p$. In the event a successful tracking based segmentation result is determined, the process 700 can update the current segmentation status M at operation 718 (including setting F=0 and $N_p = N_c$). Once the status M is updated, the current frame is then stored in the buffer (or other type of storage) at operation 730.

Returning to operation 716, if it is determined that the $t1N_p < N_c < t2N_p$ condition is not met and thus that the tracking based segmentation was not a success (a "No" decision at operation 716), the process 700 performs plane detection and object segmentation to segment the plane and object in the current frame. Similarly, if it is determined at operation 712 that F is greater than or equal to $F_{MAX}$, the process 700 performs plane detection and object segmentation for the current frame. At operation 720, the process 700 determines whether the plane detection based segmentation was a success (based on the condition in Equation (6)). If the plane detection based segmentation is determined to be unsuccessful at operation 720, the process 700 increases the F value by 1 at operation 722. If the plane detection based segmentation is determined to be a success at operation 720, the process 700 updates current segmentation status M at operation 728 (including setting T=0, F=0, $N_p = N_c$, and P as the plane equation for the plane detected in the current frame based on the plane detection performed before operation 720).

Returning to operation 710, if it is determined that T is greater than or equal to $T_{MAX}$, the process 700 performs plane detection and object segmentation to segment the plane and the object in the current frame. The process 700 proceeds to operation 726 to determine whether the plane detection based segmentation was a success (based on the condition in Equation (6)). If the plane detection based segmentation is determined to be unsuccessful at operation 720, the process 700 increases the T value by 1 at operation 714 and then continues to operation 716 as described above. If the plane detection based segmentation is determined to be successful at operation 726, the process 700 updates current segmentation status M at operation 728 by setting T=0, F=0, $N_p = N_c$ and P as the plane equation for the plane detected in the current frame.

As illustrated by the process 700 described above, maintenance of the status M as each of the input frames is processed allows the model generation system 300 to be aware of the quality of the segmentation result, and to ensure that the system 300 can recover from a poor status due to tracking errors and/or segmentation errors. The tracking-based object segmentation process finds a balance between efficiency and segmentation accuracy so that it can be easily applied to various types of object scanning systems (including real-time scanning systems) for generating 3D models.

As noted above, the tracking performed by the object tracking engine 306 can determine poses of the camera and the plane in the input frames 302. Using the poses provided by the tracking engine 306, the support plane can be dynamically updated for each input frame so that all the pixels in a frame that are above the plane (corresponding to the object) can be segmented from the rest of the frame. The segmented object can be provided to the model generation engine 310 and used to generate a 3D point cloud (e.g., a partial 3D point cloud) of the object for that frame. For instance, the segmentation engine 308 can segment a partial 3D point cloud for the object for each frame. The partial 3D point cloud generated for a given frame can include points of the object observed in the fame. The segmentation engine 308 can assemble the points of various partial point clouds from multiple frames of the video to generate a complete 3D point cloud. The model generation engine 310 can then generate the 3D mesh of the 3D model by performing a reconstruction (e.g., Poisson reconstruction), as described with respect to FIG. 10. For instance, the assembled point cloud can be used to compute a tight bounding box around the object to determine the triangles and vertices, which are maintained for further remeshing and completion as described in more detail below.

In some cases, as shown in the depth map image 802 in FIG. 8A, there may be multiple objects located (e.g., stationary or moving) on the planar surface in the scene. As shown in the image 803 of FIG. 8B, the head resting on a table is a target object for which a user is attempting to generate a 3D model. However, if only the information provided by the support plane is used, the head (as the target object) cannot be segmented and thus separated from other objects that are also resting on table. In such cases, additional information may be used to ensure that only the primary target object is segmented, as shown in the image 804 of FIG. 8C.

In some examples, a shape proxy update procedure can be performed in order to successfully segment a target object from among multiple other objects resting on a support plane. For example, the model generation system 300 can determine and store information specifying the location of the target object during the scan when the input frames 302 are being captured. The location can then be used to compute seed points where a region growing procedure beings. To perform the shape proxy update procedure, the system 300 can use the segmented point cloud of each keyframe (resulting from the 3D point cloud generated for each keyframe) to approximate the location of the target object. The resulting point cloud is referred to as the shape proxy, as it represents the shape of the target object. In some examples, the shape proxy can initially be defined based on the first frame (the initial or beginning frame) of the sequence of input frames 302. For instance, it can be assumed that the object in the center of the first frame is the target object for which the user wants to generate a 3D model, and that other objects in the first frame are objects that are not of interest to the user. Only the target object can be built during the 3D model generation, and the other objects can be ignored during 3D model generation.

Seed points on the shape proxy can be sampled and projected to subsequent input frames with the pose estimated from the tracking engine 306. The segmentation can be performed using a flood fill technique by growing the seed points in an n-connected (e.g., a 4-connected) neighborhood until the plane is reached. For example, initial two-dimensional (2D) seed points can be computed by projecting the 3D shape proxy points to 2D. The number of initial points can be validated and quality results can be achieved by using a point corresponding to a barycenter of the shape proxy. During segmentation, four points located on the left, right, above, and below the seed point are included in a stack if these four points are not on the plane. This process can be repeated by using the stack head (e.g., the point at the top or bottom of the stack) as a new seed point. The process can end when the stack is empty. The shape proxy can then be updated when segmentation is successful on a keyframe, which can ensure only points of a target object contribute to the shape proxy. In some examples, more than one technique can be used for seed point sampling, which can provide balance between computation cost and the completeness of the segmentation. For instance, a first technique for the seed point sampling can include taking one seed point by averaging all points on the shape proxy. The single seed based solution works well in many cases. In some cases, the single seed based solution may result in output of an incomplete segmentation if the depth information is deficient (e.g., due to sensor noise).

Another technique for seed sampling can include sampling multiple seeds. To perform the multiple seed based approach, a current point cloud assembled from previous keyframes can be quantized on a grid. The interval between each pair of adjacent points in the grid can be preset (e.g., based on settings desired by a user or the scanning system). The points on the grid can then be projected back to the current image space, and the 2D positions of the points can be used as new seeds.

Figure 9B:
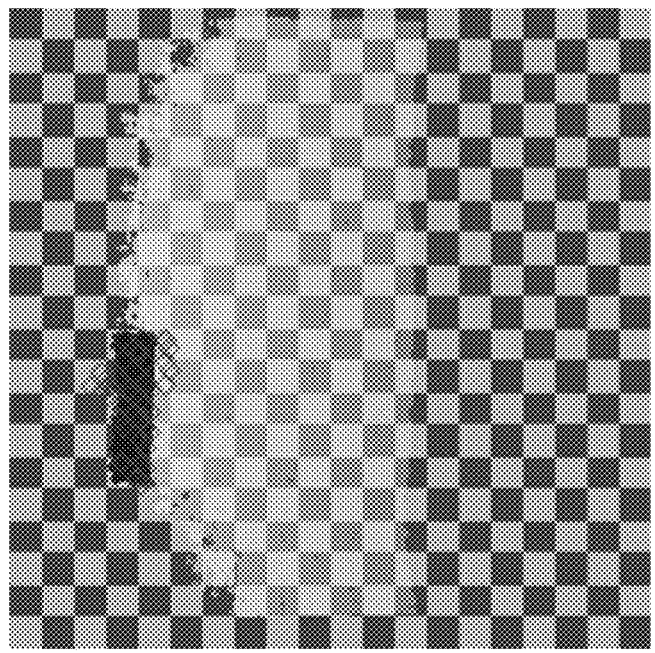
FIG. 9B is an image illustrating a result of a multiple seed approach, in accordance with some examples.
Figure 9A:
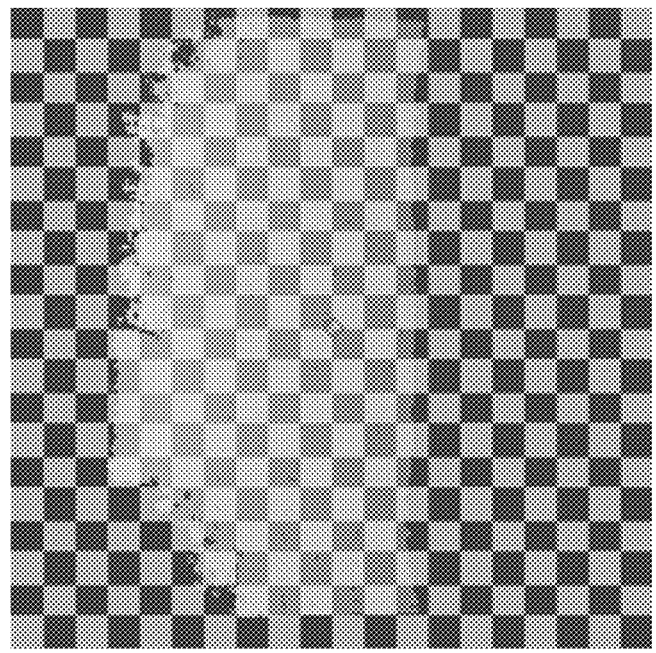
FIG. 9A is an image illustrating a result of a single seed approach, in accordance with some examples.

FIG. 9A is an image 902 illustrating a result of the single seed approach, and FIG. 9B is an image 903 illustrating a result of the multiple seed approach. In FIG. 9A, the projected position of a single seed is out of the target object area (and is located on a plane) due to noise in the input frame. As a result, the system 300 loses track of the object. As shown in FIG. 9B, using more seed candidates can help to correctly target the target object and segment the object out of the planar surface. Introducing more seed points is more computationally intensive than the one seed approach, but can effectively correct the issue that arises due to incomplete segmentation. A fewer number of seeds (e.g., only using points located on the object boundary) can be used (as specified by the system 300 or by a user) in order to speed up the process. The system 300 can switch between the two modes based on available computational resources and/or based on quality expectations.

As previously described, the 3D model generated by the model generation engine 310 (based on the segmentation results from the tracking-based segmentation or the plane detection-based segmentation) may have a hollow appearance for the portion of the object that was occluded by the planar surface. The mesh refinement engine 312 can perform the boundary remeshing process noted above. Using the boundary remeshing process, a refined mesh can be generated for the portion of the 3D model corresponding to the portion of the object (e.g., the bottom of the object) positioned on the planar surface. As described in more detail below, the boundary remeshing process can detect and process multiple closed boundaries under ambiguous geometric conditions, such as when one vertex is shared by $n(n>2)$ edges on a boundary. Generating the refined mesh allows the 3D model to be output (e.g., a 3D model 314) with the occluded portion completed.

Figure 10:
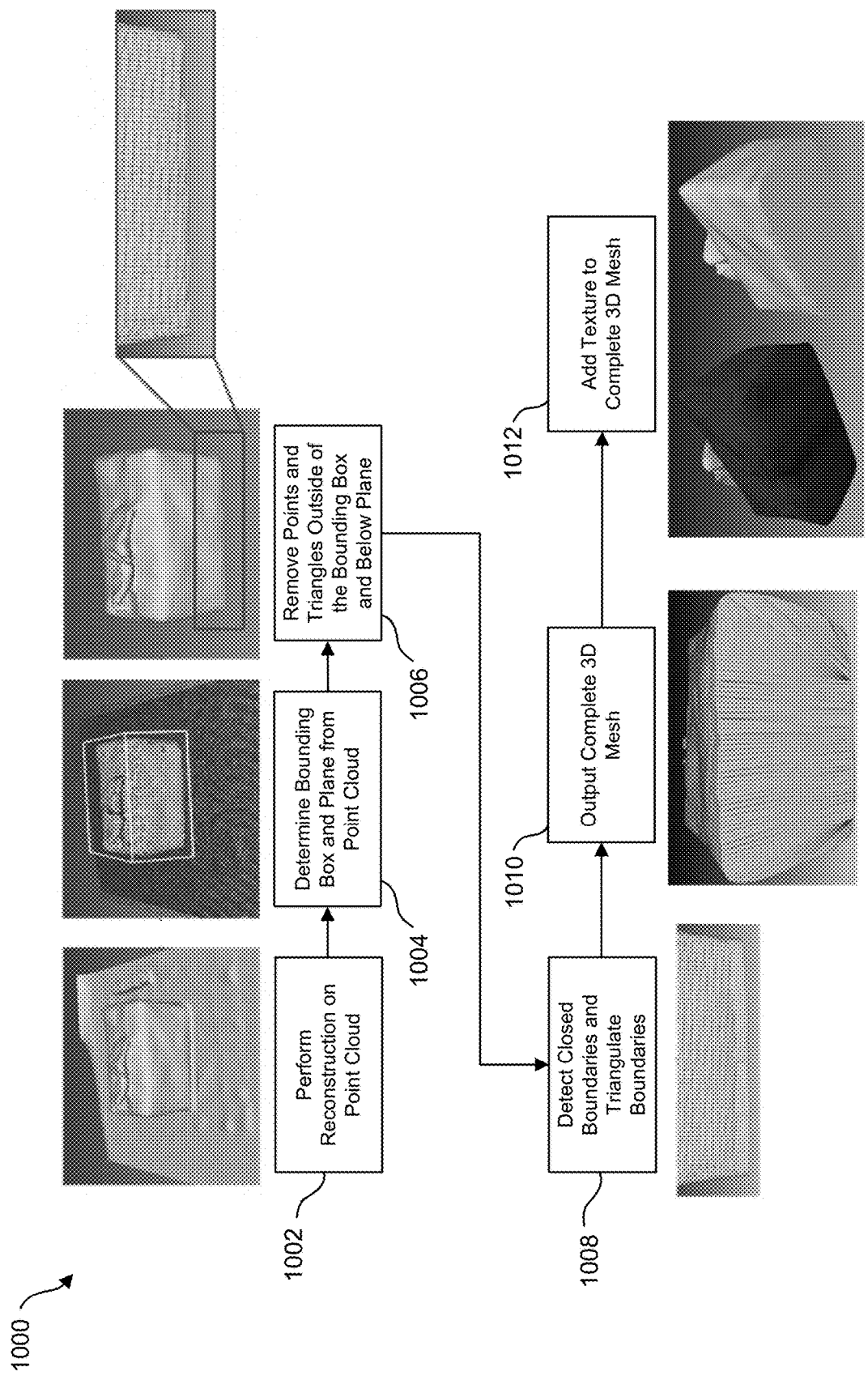
FIG. 10 is a flow diagram illustrating an example process for generating a 3D model including a remeshed bottom portion, in accordance with some examples.

FIG. 10 is a flow diagram illustrating an example of a process 1000 for generating a 3D model including a remeshed bottom portion (remeshed using the boundary remeshing process). Each operation of the process 1000 is accompanied by an image providing an illustration of the results of that particular operation. At operation 1002, the process 1000 includes performing reconstruction on the point clouds (of the 3D model) provided by the model generation engine 310. For example, the mesh refinement engine 312 can reconstruct the mesh by performing Poisson reconstruction given the assembled point clouds generated from the various frames.

At operation 1004, the process 1000 includes determining a tight or fitted bounding box (e.g., fitted around the boundaries of the object) and plane from the point cloud. For example, the mesh refinement engine 312 can aggregate the segmented points provided by the tracking-based object segmentation process described above, and can compute the tight bounding box around those segmented points. The bounding box can represent the area of the mesh that is going to be preserved and used for later processing. For example, the process 1000 can keep only the points (e.g., mesh vertices and triangles) from the point cloud that are within the bounding box and can remove (e.g., cut or delete) the rest of the points (e.g., vertices and triangles) in operation 1006 of the process 1000. The bounding box can be determined so that it fits tightly around the segmented points.

At operation 1006, the process 1000 includes removing points (or vertices) and triangles (of the mesh) that are outside of the bounding box and that are below the plane. For example, the mesh refinement engine 312 can cut the mesh by removing all the points and triangles that are outside of the bounding box and that are below the detected planar surface. After operation 1006, the resulting mesh is isolated or segmented out from the support plane (e.g., a table or other surface), but the bottom boundary of the object has visual artifacts that are not suitable for output. For example, after removing the unwanted points (or vertices) and the triangles at operation 1006, the result is a mesh $\mathcal{M}$ with an opened bottom. In order to make the result visually pleasant, the boundary remeshing process is applied to the mesh bottom boundary (corresponding to the portion of the object that is resting on the support plane) so that vertices are aligned with the bottom level. For example, at operation 1008, the process 1000 includes detecting closed boundaries and triangulating the boundaries (e.g., by aligning the boundaries to the support plane). The triangulation is applied on the vertices of bottom boundary to patch up the bottom of the 3D model. Further details related to the boundary remeshing process are described below. The process 1000 outputs the complete 3D mesh at operation 1010, and maps texture to the bottom triangles at operation 1012 in order to achieve visual consistency between the synthesized bottom portion and the original object.

As noted above, a mesh $\mathcal{M}$ with an open bottom remains after removing the unwanted points and triangles. A triangulation scheme can be used to remesh the bottom portion by decomposing a simple polygon into a triangle collection. A problem encountered in computer graphics is how to decompose a simple polygon into a collection of triangles with vertices that are only those of the simple polygon. A simple polygon is an ordered sequence of points, and consecutive vertices are connected by an edge. Each vertex shares exactly two edges. The only place where edges are allowed to intersect are at the vertices. Because of the requirements that a simple polygon requires an ordered sequence of vertices and that each vertex is to share exactly two edges, direct triangulation cannot be directly used to complete the bottom portion. To overcome such an issue, the triangulation scheme can be used to transform an edge list specifying the open bottom of the mesh to a simple polygon to meet these two requirements. For example, the mesh refinement engine 312 can determine all n oriented boundaries $\varepsilon=\{c_i|i=1 \ldots n\}$ on the mesh $\mathcal{M}$, where $c_i$ denotes the subset of edges on $\mathcal{M}$ that makes up a closed loop connection. Given boundaries $\varepsilon$, the mesh refinement engine 312 can triangulate each closed connection or boundary by performing the point triangulation technique.

In some examples, an ear clipping triangulation method can be used for the triangulation. For instance, given a simple polygon, the mesh refinement engine 312 can iteratively segment the "ear triangle" on the polygon and remove that triangle from the polygon. An ear triangle of a polygon is a triangle formed by three consecutive vertices Vi0, Vi1, and Vi2, for which Vi1 is a convex vertex (the interior angle at the vertex is smaller than $\pi$ radians), the line segment from Vi0 to Vi2 lies completely inside the polygon, and no vertices of the polygon are contained in the triangle other than the three vertices of the triangle. The triangulation process can end when the polygon vertices set is empty.

The mesh refinement engine 312 can compute the boundaries $\varepsilon$ from $\mathcal{M}$ by performing three operations. The first operation includes building or generating a boundary set B including edges located at the mesh boundary, the second operation includes dividing the boundary set B into subsets $b_i$ of edges composing one closed boundary, and the third operation includes reorienting the edge subsets $b_i$.

After Poisson reconstruction, the mesh is watertight (with no holes). Each hole in the mesh $\mathcal{M}$ is caused by the plane removal (which is performed after the reconstruction). The mesh refinement engine 312 can thus perform the first operation to identify the boundaries of the hole (denoted as the boundary set B). The mesh refinement engine 312 can determine the boundary set B by detecting hole in the mesh $\mathcal{M}$. Each edge on the mesh $\mathcal{M}$ has two triangles except for the edges located at the hole (at the bottom of the mesh $\mathcal{M}$). Because of this feature of the mesh, the boundary set B can be built by partitioning an edge list of all triangles to find the edges that are included in only one triangle. An element in the edge list can correspond to an edge and can include an array saving two integers indexing the vertex identifier (id) of that edge. In some implementations, an edge AB is equal to edge BA. The edge list can be computed from the triangle list which is part of the 3D mesh. The mesh refinement engine 312 can thus identify the edges located at the mesh boundary by traversing the edge list and retrieving the edges that belong to only one triangle. The retrieved edges that have only one triangle can be added to the boundary set B.

The remeshing cannot be performed using only the boundary set B. To perform the remeshing, the connection orientation between the edges in the boundary set B needs to be determined. The connection orientation can refer to the connection between the edges from the beginning of the hole to the end of the hole, completing the loop. For example, the connection orientation refers to an ordered sequence of n points, V0 through Vn-1. Consecutive vertices are connected by an edge <Vi, Vi+1>, 0≤i≤n-2, and an edge <Vn-1, V0> connects the first and last points. The mesh refinement engine 312 can divide the boundary set B into n subsets $\{b_i|i=1 \ldots n\}$. The n subsets are also referred to as connected components or edge connections, since each subset $b_i$ includes edges including one closed boundary. In some examples, a quick union find algorithm can be applied on the boundary set B to find all of the n connected components $\{b_i|i=1 \ldots n\}$. The quick union preserves an index representing the root for each vertex. When the process begins, every vertex root is itself. The edge list is then transversed, and the root of 'a' to root of 'b' is assigned when 'a' and 'b' are determined to be connected to each other. Using such a process, all the connected vertices (the isolated hole) are categorized into the same root. The root vertices can be recognized by checking if i==root(i) where i donates the index of vertex Vi. When applying the union find operation, a list $\mathcal{N}$ is maintained to record the edge connections. The list $\mathcal{N}$ includes l entries, where l equals to number of vertices of B. Each entry in the list $\mathcal{N}$ can be generalized to record more than one pair of edges that go in and out of the list $\mathcal{N}$. For instance, as shown in FIG. 11A, vertex V1 is associated with two edges V2 and V5. The entry associated with vertex V1 can be generalized to a list to save both V2 and V5. Otherwise, the hole passing V2(V5) would be missed for completion. For an edge $e_{ij}$ in B, the mesh refinement engine 312 can include index $v_j$ at entry i of the list $\mathcal{N}$. The list $\mathcal{N}$ allows an efficient way to order the subsets $b_i$ for use by the third operation of reorienting the edge sets $b_i$.

The mesh refinement engine 312 can reorient every edge subset $b_i$ by checking the directed loop following each entry in $\mathcal{N}$. For example, the edge subsets can be reoriented by iteratively retrieving vertex indices from list $\mathcal{N}$ and removing (or popping) the retrieved element out of list $\mathcal{N}$. For instance, as shown in in FIG. 11, the mesh refinement engine 312 can start from the first entry of list $\mathcal{N}$ and can remove (or pop out) v2 out of the list $\mathcal{N}$. The mesh refinement engine 312 can then find the second entry and pop v3 out of the list $\mathcal{N}$. The third entry is then found and the element that gets removed is v1, which is the starting point. The process is then ended and conclude the ordered loop of v1→v2→v3. All entries l in $\mathcal{N}$ that have already been traversed can be removed (or popped out) from the list N to prevent any repetitive paths. The mesh refinement engine 312 can collect the loops found in the boundaries $\varepsilon$ and can consider that all loops have been found once the list $\mathcal{N}$ is empty.

FIG. 11A, FIG. 11B, and FIG. 11C are diagrams illustrating an example of operations of the boundary remeshing process. For example, mesh refinement engine 312 can start with any vertex v from a subset $b_i$ and can iteratively search the next vertex until vertex v appears for a second time. The iterative search is performed in one direction, as indicated by the arrows shown in FIG. 11A. For example, the search can start at vertex $v_1$, going next to vertex $v_2$, then to vertex $v_3$, and returning to vertex $v_1$. The edge between $v_1$ and $v_2$ is denoted as $e_{12}$. Similar edges are shown in FIG. 11A between the other vertices. All the vertices that were encountered during the iterative search process for a given loop (or hole in the mesh $\mathcal{M}$) can be assembled to generate an ordered edge set $c_i$.

Each entry in the list 1132 in FIG. 11B records the one or more vertices to which a particular vertex is connected (in the direction of the arrows corresponding to the direction of traversal of iterative search to the various vertices). For example, the top entry in the list 1132 in FIG. 11B records the one or more vertices to which the vertex $v_1$ is connected. As shown, the vertex $v_1$ connects to vertices $v_2$ and $v_5$. The second entry from the top corresponds to the vertex (which is the vertex $v_3$) that is connected to the vertex $v_2$, the middle entry corresponds to the vertex (vertex $v_1$) that is connected to the vertex $v_3$, and so on. All of the other vertices (other than $v_1$) have only one connection, and thus have only one entry in the list 1132 shown in FIG. 11B.

In many cases, each vertex on the boundary has only one edge in and one edge out. For example, as shown in FIG. 11A, vertex $v_2$ has one edge $e_{12}$ coming into it, and one edge $e_{23}$ going out of it in the direction of the iterative search (as indicated by the arrows in FIG. 11A). In some cases, there can be vertices that have more than one pair of edges that go in and out (e.g., due to the quick union operation). For example, as shown in FIG. 11A, the vertex $v_1$ has two edges $e_{31}$ and $e_{41}$ coming into it and two edges $e_{12}$ and $e_{15}$ going out of it in the direction of the iterative search (hence the two entries in the list 1132 for the vertex $v_1$). To resolve the issue of multiple edges going in and out of a particular vertex, each entry in list $\mathcal{N}$ can be generalized to a dynamic list. FIG. 11B is a diagram illustrating an example of a modified list 1132 to take into account the multiple edges for a given vertex. For example, as shown with respect to the first entry (the vertex $v_2$) shown in the list of FIG. 11B, the vertex $v_5$ is appended to the end of the $v_2$ entry so that $\mathcal{N}$ records both edge $e_{12}$ and $e_{15}$ as two vertices that go out of vertex $v_1$.

Given the modified list $\mathcal{N}$ (e.g., the list 1132 shown in FIG. 11B), the mesh refinement engine 312 assembles all the vertices that were encountered during the search process to form a closed loop. Each loop is denoted as an ordered edge set $c_i$ that is included in the boundaries $\varepsilon = \{c_i | i=1 \ldots n\}$. For example, as shown in FIG. 11B, the following loop is obtained: $v_1 \rightarrow v_2 \rightarrow v_3 \rightarrow v_1$. The loop $v_1 \rightarrow v_2 \rightarrow v_3 \rightarrow v_1$ corresponds to one hole in the bottom of an object 3D model. The other loop $v_1 \rightarrow v_5 \rightarrow v_4 \rightarrow v_1$ corresponds to another hole in the bottom of the object 3D model. As noted above, all entries in $\mathcal{N}$ that have been traversed can be removed (or popped out) from the list $\mathcal{N}$ to prevent any repetitive loops. FIG. 11C is an example of the list $\mathcal{N}$ with repetitive entries are removed (where removed entries are crossed out with an "x") after traversing the loop $v_1 \rightarrow v_2 \rightarrow v_3 \rightarrow v_1$. For example, the vertices $v_1$, $v_2$, and $v_3$ are processed when traversing the loop $v_1 \rightarrow v_2 \rightarrow v_3 \rightarrow v_1$, and are removed from the list $\mathcal{N}$ once the loop $v_1 \rightarrow v_2 \rightarrow v_3 \rightarrow v_1$ is complete. The list $\mathcal{N}$ can be processed again to obtain another loop $v_1 \rightarrow v_5 \rightarrow v_4 \rightarrow v_1$. Because the vertex $v_2$ has been removed, when the iterative process returns to the vertex $v_1$, the iterative search will not go to $v_2$ and will instead proceed to $v_5$ for processing the next loop $v_1 \rightarrow v_5 \rightarrow v_4 \rightarrow v_1$. Although the vertex $v_1$ has already been processed and is removed from the list (as shown in FIG. 11C), the search will consider the vertex $v_1$ again because it is included in the list twice. The search process can be repeated until all the loops in the list $\mathcal{N}$ are found. The mesh refinement engine 312 can determine that all the loops are found when $\mathcal{N}$ is empty.

The loops found using the iterative search process correspond to the holes in the mesh at the bottom of the object positioned on the planar surface. Each loop is included as an ordered edge set $c_i$ that is included in the n oriented boundaries $\varepsilon = \{c_i | i=1 \ldots n\}$ defining boundary or boundaries of the one or more holes in the bottom of the mesh $\mathcal{M}$. The mesh refinement engine 312 can use the boundaries $\varepsilon$ to triangulate each closed boundary using the point triangulation technique, thus completing the refined mesh. The bottom of the 3D model is thus refined and can be output.

Using the systems and techniques described herein, a complete 3D model can be generated for an object that is positioned on a planar surface. The systems and techniques allow a 3D model to be generated for such an object on the fly (in real-time), without requiring pre-recorded frames to be captured of a scene including the object. The systems and techniques utilize a plane tracking-based approach for object segmentation, but can account for drifting and other errors that can occur during tracking (e.g., drifting) and can also ensure that the plane segmentation (used for segmenting the object from the plane) has high accuracy. Because the plane tracking-based segmentation is used, plane detection is not needed for every input frame. Such a solution reduces computational complexity.

FIG. 12 is a flowchart illustrating an example of a process 1200 of generating one or more three-dimensional models using the techniques described herein. At operation 1202, the process 1200 includes obtaining at least one frame of an object in a scene. For example, an image capture device (e.g., a camera) can be used to capture the at least one frame. In another example, the at least one frame can be retrieved from storage. A portion of the object is positioned on a plane in the at least one frame. For instance, as shown in FIG. 1A, the bottom of the object 110 is positioned on the plane 111. In some cases, multiple frames of the object can be obtained (e.g., captured by an image capture device, retrieved from storage, or otherwise obtained). In some examples, the at least one frame includes depth information corresponding to depths of pixels of the at least one frame within the scene.

At operation 1204, the process 1200 includes detecting the plane in the at least one frame. For example, as described above, plane detection can be performed to detect the plane in the at least one frame. At operation 1206, the process 1200 includes segmenting, based on the detected plane, the object from the plane in the at least one frame.

At operation 1208, the process 1200 includes generating a three-dimensional (3D) model of the object based on segmenting the object from the plane. In some examples, the at least one frame includes a first frame, and the process 1200 can include obtaining a second frame of the object in the scene. The portion of the object is also positioned on the plane in the second frame. The process 1200 can include tracking the plane from the first frame to the second frame. Based on tracking the plane, the process 1200 can include segmenting the object from the plane in the second frame. The process 1200 can generate the 3D model of the object based on segmenting the object from the plane in the first frame and the second frame. In some cases, tracking the plane from the first frame to the second frame includes tracking a pose of the plane. The object is segmented from the plane based on the tracked pose of the plane in the second frame, as described above.

In some examples, the process 1200 includes determining a number of pixels of the object segmented from the second frame and determining the number of pixels is within a threshold number of pixels of the object segmented from the first frame. Based on the number of pixels being within the threshold number of pixels of the object segmented from the first frame, the process 1200 can include determining segmentation of the object from the plane in the second frame is successful.

In some examples, the process 1200 can include determining a number of frames the plane has been tracked, and determining whether to perform plane detection or object tracking on the second frame based on the number of frames the plane has been tracked. In some cases, the process 1200 includes detecting the plane based on plane detection in the second frame when it is determined that the number of frames the plane has been tracked meets a tracking threshold. In some cases, the process 1200 includes tracking the plane based on object tracking from the first frame to the second frame when it is determined that the number of frames the plane has been tracked is less than a tracking threshold.

In some examples, the process 1200 includes determining a number of plane segmentation failures for the object. As described above, a plane segmentation failure can occur when the object is not segmented from the plane in a frame. The process 1200 can detect the plane in the second frame based on a determination that the number of plane segmentation failures for the object meets a failure threshold.

In some examples, the 3D model of the object can be generated based on point clouds determined for the object in multiple frames. For example, the process 1200 can obtain a first frame of the object in the scene, segment the object from the plane in the first frame, and generate a first 3D mesh of points associated with the object in the first frame. The process 1200 can obtain a second frame of the object in the scene, segment the object from the plane in the second frame, and generate a second 3D mesh of points associated with the object in the first frame. The process 1200 can then generate the 3D model by combining the first 3D mesh of points and the second 3D mesh of points.

At operation 1210, the process 1200 includes generating a refined mesh for a portion of the 3D model corresponding to the portion of the object positioned on the plane. As noted above, the portion of the object positioned on the plane can result in a hole in the portion of the 3D model corresponding to the portion of the object positioned on the plane. In some examples, generating the refined mesh for the portion of the 3D model of the object includes generating an initial mesh for the portion of the 3D model of the object, determining a boundary set including edges of the initial mesh that belong to a single triangle of the initial mesh, and generating the refined mesh for the portion of the 3D model of the object using the boundary set. Further details regarding generation of the refined mesh are described above.

In some examples, the processes described herein (e.g., processes 600, 700, 100, 1200, and/or other process described herein) may be performed by a computing device or apparatus. In one example, the process 1200 can be performed by the model generation system 300 of FIG. 3. In another example, the process 1200 can be performed by the model generation system 300 of FIG. 3. In another example, the process 1200 can be performed by the computing system 1300 shown in FIG. 13. For instance, a computing device with the computing system 1300 shown in FIG. 13 can include the components of the model generation system 300 and can implement the operations of FIG. 12.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 600, 700, 100, 1200, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 600, 700, 100, and 1200 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 600, 700, 100, 1200, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
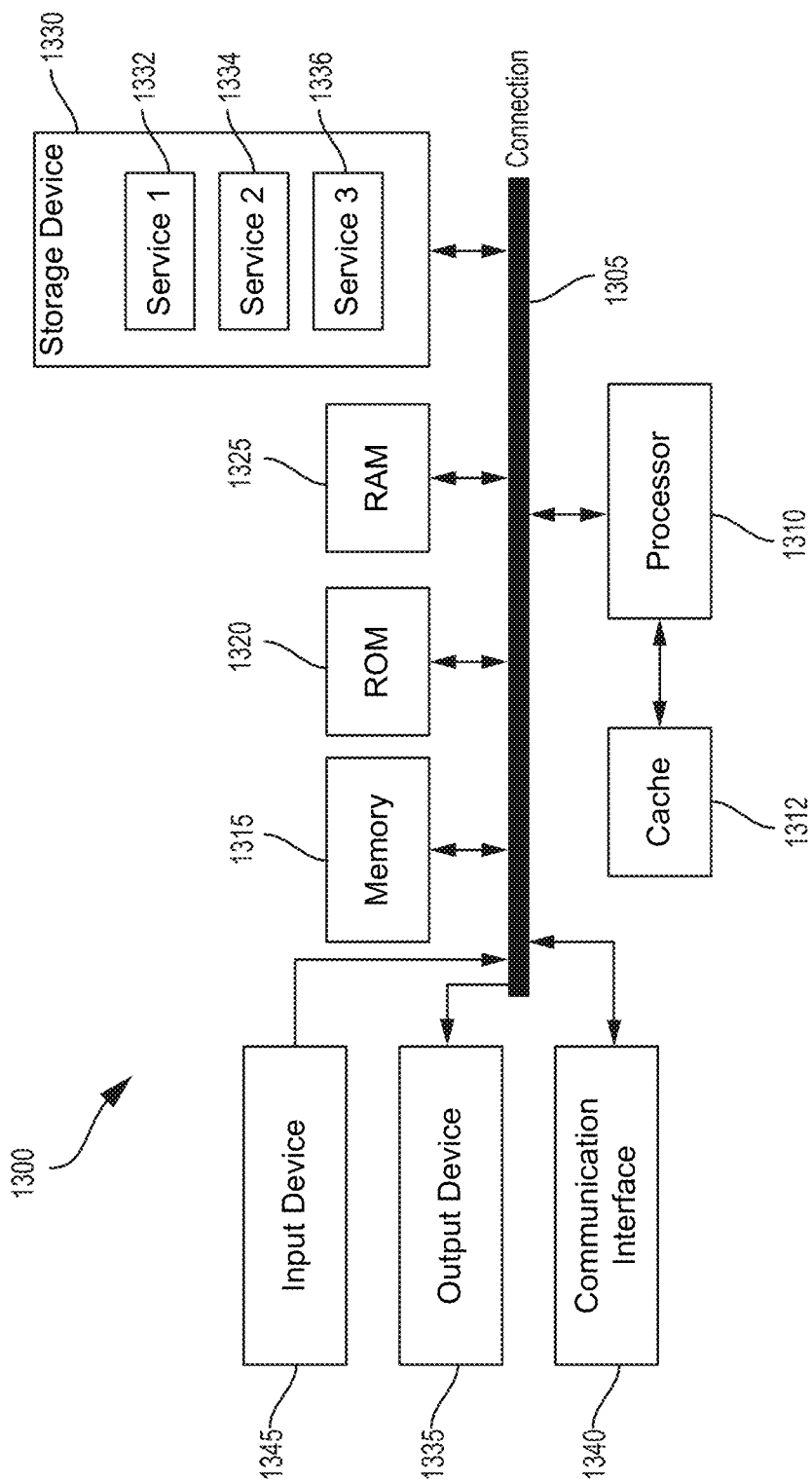
FIG. 13 is a diagram illustrating an example system for implementing certain aspects described herein.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of generating one or more three-dimensional models, the method comprising:
    obtaining a first frame of an object in a scene, wherein a portion of the object is positioned on a plane in the first frame;
    detecting the plane in the first frame;
    segmenting, based on the detected plane, the object from the plane in the first frame;
    generating a three-dimensional (3D) model of the object based on segmenting the object from the plane;
    generating a refined mesh for a portion of the 3D model corresponding to the portion of the object positioned on the plane;
    obtaining a second frame of the object in the scene, wherein the portion of the object is positioned on the plane in the second frame;
    determining a segmentation consistency metric for the second frame; and
    based on the segmentation consistency metric determined for the second frame, determining whether to generate a 3D model of the object for the second frame based on performing plane detection or object tracking on the second frame.

2. The method of claim 1, wherein the first frame includes depth information corresponding to depths of pixels of the first frame within the scene.

3. The method of claim 1, further comprising:
    tracking the plane from the first frame to the second frame based on the segmentation consistency metric for the second frame;
    segmenting, based on tracking the plane, the object from the plane in the second frame; and
    generating the 3D model of the object for the second frame based on segmenting the object from the plane in the second frame.

4. The method of claim 3, wherein tracking the plane from the first frame to the second frame includes tracking a pose of the plane, and wherein the object is segmented from the plane based on the tracked pose of the plane in the second frame.

5. The method of claim 3, wherein:
    determining the segmentation consistency metric for the second frame comprises:
        determining a number of pixels of the object segmented from the second frame; and
        determining the number of pixels is within a threshold number of pixels of the object segmented from the first frame; and
    the method further comprises:
        based on the number of pixels being within the threshold number of pixels of the object segmented from the first frame, determining segmentation of the object from the plane in the second frame is successful.

6. The method of claim 1, wherein determining the segmentation consistency metric for the second frame includes determining a number of frames for which the plane has been tracked, the method further comprising:

determining whether to perform plane detection or object tracking on the second frame based on the number of frames the plane has been tracked.

7. The method of claim 6, further comprising:
detecting the plane based on performing the plane detection on the second frame based on a determination that the number of frames the plane has been tracked meets a tracking threshold; and
generating the 3D model of the object for the second frame based on detecting the plane.

8. The method of claim 6, further comprising:
tracking the plane based on performing the object tracking from the first frame to the second frame based on a determination that the number of frames the plane has been tracked is less than a tracking threshold; and
generating the 3D model of the object for the second frame based on tracking the plane.

9. The method of claim 1, wherein determining the segmentation consistency metric for the second frame includes determining a number of plane segmentation failures for the object, a plane segmentation failure occurring when the object is not segmented from the plane in a frame, the method further comprising
detecting the plane in the second frame based on a determination that the number of plane segmentation failures for the object meets a failure threshold.

10. The method of claim 1, wherein generating the refined mesh for the portion of the 3D model of the object includes:
generating an initial mesh for the portion of the 3D model of the object;
determining a boundary set including edges of the initial mesh that belong to a single triangle of the initial mesh; and
generating the refined mesh for the portion of the 3D model of the object using the boundary set.

11. The method of claim 1, wherein generating the 3D model of the object includes:
segmenting the object from the plane in the first frame;
generating a first 3D mesh of points associated with the object in the first frame;
segmenting the object from the plane in the second frame;
generating a second 3D mesh of points associated with the object in the first frame; and
combining the first 3D mesh of points and the second 3D mesh of points.

12. An apparatus for generating one or more three-dimensional models, comprising:
a memory configured to store one or more frames; and
one or more processors coupled to the memory and configured to:
obtain a first frame of an object in a scene, wherein a portion of the object is positioned on a plane in the first frame;
detect the plane in the first frame;
segment, based on the detected plane, the object from the plane in the first frame;
generate a three-dimensional (3D) model of the object based on segmenting the object from the plane;
generate a refined mesh for a portion of the 3D model corresponding to the portion of the object positioned on the plane;
obtain a second frame of the object in the scene, wherein the portion of the object is positioned on the plane in the second frame;
determine a segmentation consistency metric for the second frame; and
based on the segmentation consistency metric determined for the second frame, determine whether to generate a 3D model of the object for the second frame based on performing plane detection or object tracking on the second frame.

13. The apparatus of claim 12, wherein the first frame includes depth information corresponding to depths of pixels of the first frame within the scene.

14. The apparatus of claim 12, wherein the one or more processors are configured to:
track the plane from the first frame to the second frame based on the segmentation consistency metric for the second frame;
segment, based on tracking the plane, the object from the plane in the second frame; and
generate the 3D model of the object for the second frame based on segmenting the object from the plane in the second frame.

15. The apparatus of claim 14, wherein tracking the plane from the first frame to the second frame includes tracking a pose of the plane, and wherein the object is segmented from the plane based on the tracked pose of the plane in the second frame.

16. The apparatus of claim 14, wherein:
to determine the segmentation consistency metric for the second frame, the one or more processors are configured to:
determine a number of pixels of the object segmented from the second frame; and
determine the number of pixels is within a threshold number of pixels of the object segmented from the first frame; and
the one or more processors are further configured to, based on the number of pixels being within the threshold number of pixels of the object segmented from the first frame, determine segmentation of the object from the plane in the second frame is successful.

17. The apparatus of claim 12, wherein, to determine the segmentation consistency metric for the second frame, the one or more processors are configured to determine a number of frames for which the plane has been tracked, wherein the one or more processors are further configured to:
determine whether to perform plane detection or object tracking on the second frame based on the number of frames the plane has been tracked.

18. The apparatus of claim 17, wherein the one or more processors are configured to:
detect the plane based on performing the plane detection on the second frame based on a determination that the number of frames the plane has been tracked meets a tracking threshold; and
generate the 3D model of the object for the second frame based on detecting the plane.

19. The apparatus of claim 17, wherein the one or more processors are configured to:
track the plane based on performing the object tracking from the first frame to the second frame based on a determination that the number of frames the plane has been tracked is less than a tracking threshold; and
generate the 3D model of the object for the second frame based on tracking the plane.

20. The apparatus of claim 12, wherein, to determine the segmentation consistency metric for the second frame, the one or more processors are configured to determine a number of plane segmentation failures for the object, a plane segmentation failure occurring when the object is not segmented from the plane in a frame, wherein the one or more processors are further configured to:

detect the plane in the second frame based on a determination that the number of plane segmentation failures for the object meets a failure threshold.

21. The apparatus of claim 12, wherein generating the refined mesh for the portion of the 3D model of the object includes:

generating an initial mesh for the portion of the 3D model of the object;

determining a boundary set including edges of the initial mesh that belong to a single triangle of the initial mesh; and generating the refined mesh for the portion of the 3D model of the object using the boundary set.

22. The apparatus of claim 12, wherein generating the 3D model of the object includes:

segmenting the object from the plane in the first frame;

generating a first 3D mesh of points associated with the object in the first frame;

segmenting the object from the plane in the second frame;

generating a second 3D mesh of points associated with the object in the first frame; and combining the first 3D mesh of points and the second 3D mesh of points.

23. The apparatus of claim 12, wherein the apparatus is a mobile device.

24. The apparatus of claim 12, further comprising a camera configured to capture the one or more frames.

25. The apparatus of claim 12, further comprising a display configured to display the 3D model of the object.

26. A non-transitory computer-readable medium is provided that has stored thereon instructions that, when executed by one or more processors, cause the one or more processors to:

obtain a first frame of an object in a scene, wherein a portion of the object is positioned on a plane in the first frame;

detect the plane in the first frame;

segment, based on the detected plane, the object from the plane in the first frame;

generate a three-dimensional (3D) model of the object based on segmenting the object from the plane;

generate a refined mesh for a portion of the 3D model corresponding to the portion of the object positioned on the plane;

obtain a second frame of the object in the scene, wherein the portion of the object is positioned on the plane in the second frame;

determine a segmentation consistency metric for the second frame; and based on the segmentation consistency metric determined for the second frame, determine whether to generate a 3D model of the object for the second frame based on performing plane detection or object tracking on the second frame.

27. The non-transitory computer-readable medium of claim 26, wherein the first frame includes a first frame, and further comprising instructions that, when executed by the one or more processors, cause the one or more processors to:

track the plane from the first frame to the second frame based on the segmentation consistency metric for the second frame;

segment, based on tracking the plane, the object from the plane in the second frame; and generate the 3D model of the object for the second frame based on segmenting the object from the plane in the second frame.

28. The non-transitory computer-readable medium of claim 27, wherein:

to determine the segmentation consistency metric for the second frame, the instructions, when executed by the one or more processors, cause the one or more processors to:

determine a number of pixels of the object segmented from the second frame; and determine the number of pixels is within a threshold number of pixels of the object segmented from the first frame; and the instructions, when executed by the one or more processors, further cause the one or more processors to:

based on the number of pixels being within the threshold number of pixels of the object segmented from the first frame, determining segmentation of the object from the plane in the second frame is successful.

29. The non-transitory computer-readable medium of claim 26, wherein generating the refined mesh for the portion of the 3D model of the object includes:

generate an initial mesh for the portion of the 3D model of the object;

determine a boundary set including edges of the initial mesh that belong to a single triangle of the initial mesh; and generate the refined mesh for the portion of the 3D model of the object using the boundary set.

30. The non-transitory computer-readable medium of claim 26, wherein generating the 3D model of the object includes:

segmenting the object from the plane in the first frame;

generating a first 3D mesh of points associated with the object in the first frame;

segmenting the object from the plane in the second frame;

generating a second 3D mesh of points associated with the object in the first frame; and combining the first 3D mesh of points and the second 3D mesh of points.

* * * * *